US011934858B2

(12) United States Patent
Geldart et al.

(10) Patent No.: US 11,934,858 B2
(45) Date of Patent: Mar. 19, 2024

(54) SYSTEM AND METHOD FOR REQUEST ISOLATION

(71) Applicant: Open Text GXS ULC, Halifax (CA)

(72) Inventors: Timothy Austin Geldart, Grapevine, TX (US); Dana Sue Williams, Lucas, TX (US)

(73) Assignee: OPEN TEXT GXS ULC, Halifax (CA)

( * ) Notice: Subject to any disclaimer, the term of this patent is extended or adjusted under 35 U.S.C. 154(b) by 64 days.

(21) Appl. No.: 17/337,266

(22) Filed: Jun. 2, 2021

(65) Prior Publication Data
US 2021/0303333 A1 Sep. 30, 2021

Related U.S. Application Data

(63) Continuation of application No. 16/049,065, filed on Jul. 30, 2018, now Pat. No. 11,055,128.

(51) Int. Cl.
*G06F 9/455* (2018.01)
*G06F 9/50* (2006.01)

(52) U.S. Cl.
CPC ........ *G06F 9/45558* (2013.01); *G06F 9/5027* (2013.01)

(58) Field of Classification Search
CPC ............................ G06F 9/45558; G06F 9/5027
See application file for complete search history.

(56) References Cited

U.S. PATENT DOCUMENTS 8,909,053 B2 12/2014 Brassil
10,516,672 B2 12/2019 Gupta
(Continued)

FOREIGN PATENT DOCUMENTS

WO WO 2014039921 3/2014
WO WO 2017158799 9/2017

OTHER PUBLICATIONS

Office Action for U.S. Appl. No. 15/956,556, dated Aug. 29, 2019, 14 pgs.
(Continued)

*Primary Examiner* — Kenneth Tang
(74) *Attorney, Agent, or Firm* — Sprinkle IP Law Group

(57) ABSTRACT

A system for isolating requests that comprises, a shared command queue, a first virtual computational resource and a second virtual computational resources. The first virtual computational resources comprises a policy engine configured to access policies comprising criteria for assigning commands corresponding to requests from tenants to compartments, determine, according to the policies, compartments to which to assign the commands corresponding to the requests, produce the commands corresponding to the requests, and queue the commands in the shared command queue, each command comprising compartment assignment information. The second virtual computational resource comprises a command consumer configured to access a subscription to determine a subscribed compartment to which the second virtual computational resource is subscribed, select commands from the shared command queue according to selection criteria that include the subscribed compartment, and consume the selected commands from the shared command queue for processing by the second virtual computational resource.

20 Claims, 16 Drawing Sheets

(56) References Cited

U.S. PATENT DOCUMENTS

| | | | |
|---|---|---|---|
| 10,642,668 B2 | 5/2020 | Young | |
| 11,055,128 B2 | 7/2021 | Geldart | |
| 11,263,066 B2 | 3/2022 | Young | |
| 2002/0004865 A1 | 1/2002 | Barth | |
| 2002/0078132 A1 | 6/2002 | Cullen | |
| 2002/0129264 A1 | 9/2002 | Rowland | |
| 2003/0231647 A1 | 12/2003 | Petrovykh | |
| 2005/0044552 A1 | 2/2005 | Bliss | |
| 2007/0088792 A1 | 4/2007 | Piper | |
| 2007/0253412 A1 | 11/2007 | Batteram | |
| 2009/0064153 A1 | 3/2009 | Ishimura | |
| 2009/0210876 A1 | 8/2009 | Shen | |
| 2009/0288084 A1* | 11/2009 | Astete | G06Q 30/0603 718/1 |
| 2010/0098414 A1 | 4/2010 | Kramer | |
| 2010/0313208 A1 | 12/2010 | Zarzycki | |
| 2011/0016295 A1 | 1/2011 | Catherwood et al. | |
| 2011/0225113 A1 | 9/2011 | Mann | |
| 2013/0179418 A1 | 7/2013 | Wang | |
| 2013/0238383 A1* | 9/2013 | Licari | G06Q 10/0633 705/7.27 |
| 2013/0247034 A1* | 9/2013 | Messerli | G06F 9/45533 718/1 |
| 2014/0214799 A1 | 7/2014 | Li | |
| 2014/0359113 A1* | 12/2014 | Krebs | H04L 41/5009 709/224 |
| 2015/0278323 A1* | 10/2015 | Melahn | G06F 16/178 707/610 |
| 2016/0117195 A1* | 4/2016 | Wang | G06F 16/2471 707/770 |
| 2016/0352419 A1 | 12/2016 | Fonseka | |
| 2017/0168970 A1 | 6/2017 | Sajeepa | |
| 2017/0170928 A1 | 6/2017 | Liu | |
| 2017/0286186 A1 | 10/2017 | Kagan | |
| 2018/0288077 A1* | 10/2018 | Siddiqui | H04L 63/20 |
| 2018/0293776 A1 | 10/2018 | Ray | |
| 2018/0302487 A1* | 10/2018 | Burns | H04L 67/5651 |
| 2018/0321833 A1 | 11/2018 | Nelson | |
| 2018/0321993 A1 | 11/2018 | McClory | |
| 2019/0089809 A1* | 3/2019 | Theebaprakasam | G06F 9/542 |
| 2020/0012602 A1* | 1/2020 | Zhao | G06F 17/11 |
| 2020/0257577 A1 | 8/2020 | Young | |
| 2022/0156131 A1 | 5/2022 | Young | |

OTHER PUBLICATIONS

International Search Report and Written Opinion of the International Searching Authority for International Application No. PCT/IB2019/053237, dated Aug. 20, 2019, 7 pgs.

Office Action for U.S. Appl. No. 16/049,065, dated Aug. 5, 2020, 11 pgs.

A.R. Manu, et al., Towards realizing the Secured Multilateral Co-operative Computing Architectural framework, 2014 IEEE International Conference on Cloud Computing in Emerging Markets (CCEM), Bangalore, 2014, pp. 1-14 (doi: 10.1109/CCEM.2014.7015498).

Office Action for U.S. Appl. No. 16/049,065, dated Nov. 27, 2020, 14 pgs.

Office Action for U.S. Appl. No. 16/861,004, dated Jul. 2, 2021, 28 pgs.

Office Action for U.S. Appl. No. 17/666,476, dated Jan. 4, 2023, 13 pgs.

Office Action for U.S. Appl. No. 17/666,476, dated Jun. 2, 2023, 12 pgs.

* cited by examiner

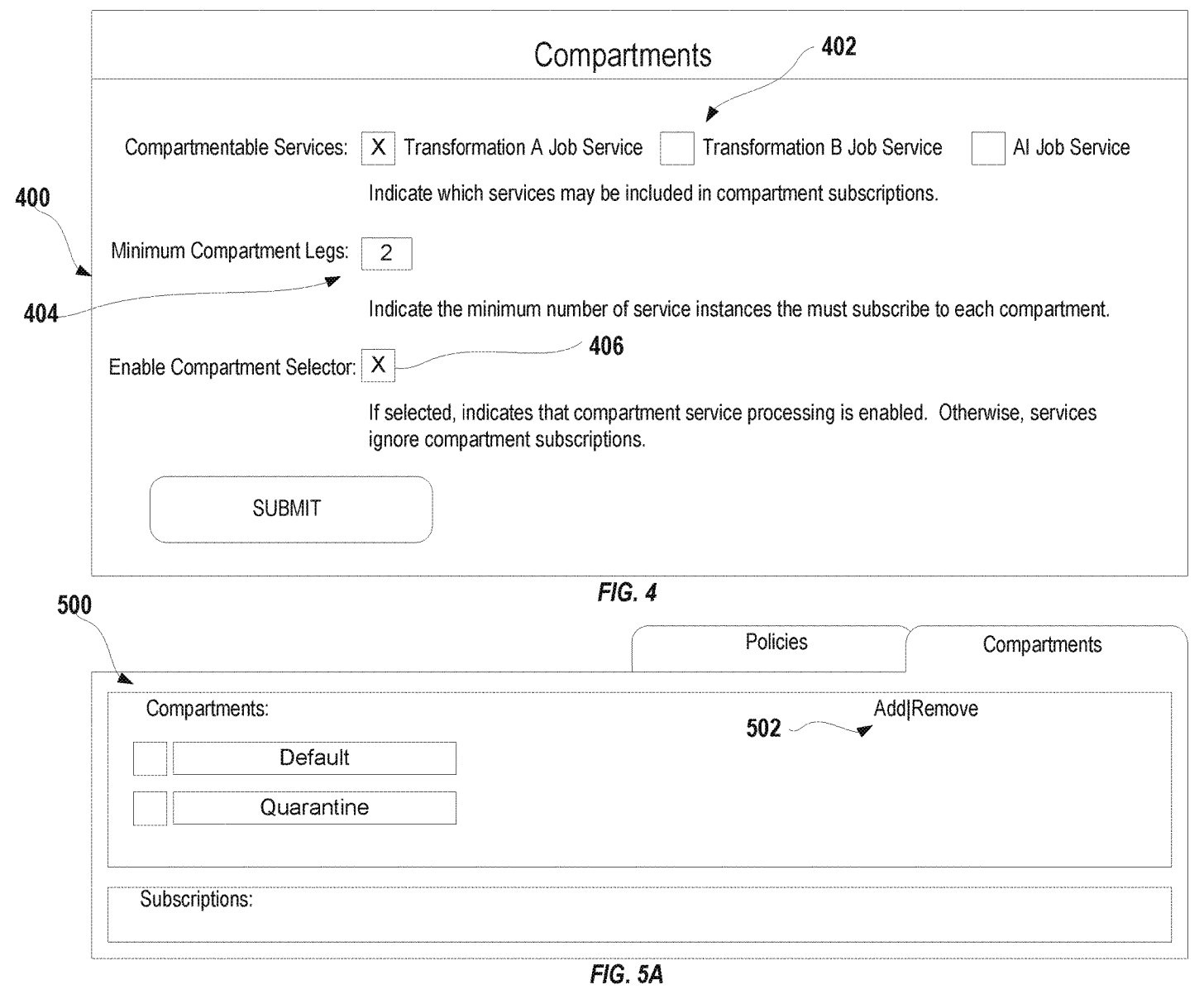

Compartments

Compartmentable Services: [X] Transformation A Job Service  [ ] Transformation B Job Service  [ ] AI Job Service Indicate which services may be included in compartment subscriptions.

Minimum Compartment Legs: [2]

Indicate the minimum number of service instances the must subscribe to each compartment.

Enable Compartment Selector: [X]

If selected, indicates that compartment service processing is enabled. Otherwise, services ignore compartment subscriptions.

SUBMIT

Policies | Compartments

Add|Remove

Compartments:
- Default
- Quarantine

Subscriptions:

*FIG. 5A*

Add Compartment

| Policies | Compartments |

Name: VIP

Active: [X]

SUBMIT

Add Subscriptions: VIP

| Policies | Compartments |

Subscribe|Remove

| | Service | ServiceID | Service Machine |
|---|---|---|---|
| X | Transformation A Job Service | 15 | Lit-vwos-q003.qa.abconline.net:53215 |
|   | Transformation A Job Service | 22 | Lit-vwos-q004.qa.abconline.net:54215 |
|   | Transformation A Job Service | 96 | Lit-vwos-q099.qa.abconline.net:52315 |
| X | Transformation A Job Service | 97 | Lit-vwos-q099.qa.abconline.net:52315 |
|   | Transformation A Job Service | 99 | Lit-vwos-q099.qa.abconline.net:52315 |

SUBMIT

Compartments: | Policies

Compartments:
- Default
- Quarantine

Add|Remove

Subscriptions:

| Compartment | Service | ServiceID | Service Machine |
|---|---|---|---|
| Default | Transformation A Job Service | 15 | Lit-vwos-q003.qa.abconline.net:53215 |
| VIP | Transformation A Job Service | 15 | Lit-vwos-q003.qa.abconline.net:53215 |
| Quarantine | Transformation A Job Service | 22 | Lit-vwos-q004.qa.abconline.net:54215 |
| Quarantine | Transformation A Job Service | 96 | Lit-vwos-q099.qa.abconline.net:52315 |
| VIP | Transformation A Job Service | 97 | Lit-vwos-q099.qa.abconline.net:52315 |
| VIP | Transformation A Job Service | 99 | Lit-vwos-q099.qa.abconline.net:52315 |

SYSTEM AND METHOD FOR REQUEST ISOLATION

CROSS-REFERENCE TO RELATED MATTER(S)

This application is a continuation of, and claims a benefit of priority under 35 U.S.C. 120 of, U.S. patent application Ser. No. 16/049,065 filed Jul. 30, 2018, issued as U.S. Pat. No. 11,055,128, entitled "System and Method for Request Isolation," which is hereby incorporated herein for all purposes.

TECHNICAL FIELD

This disclosure relates generally to systems and methods for processing requests. More particularly, this disclosure relates to systems and methods for isolating requests to virtual computational resources. Even more particularly, this disclosure relates to systems and methods for isolating requests in a multi-tenant environment.

BACKGROUND

Multi-tenant systems allow multiple users to share communications and computational resources. Sharing of resources enables the provider of a multi-tenant system to meet service level objectives (SLOs) of multiple tenants while efficiently utilizing processing resources. In some situations, however, sharing certain resources may not be ideal or appropriate. For example, a tenant issuing large requests or requests of a different type than expected or as agreed to can adversely affect the performance of the multi-tenant system for other tenants sharing a resource, making it difficult to meet the SLOs for all tenants. As another example, a tenant may request a certain class of service guaranteeing that processing of the tenant's requests will be isolated from processing of other tenants' requests.

Isolation of a tenant's requests in a multi-tenant system is difficult partly because of the way in which many software components communicate, particularly in distributed application environments. A multi-tenant system may utilize a message-based infrastructure, such as Java Message Service (JMS), for communication between application components. With JMS, a sender sends messages to a queue, and a recipient retrieves the message from the queue. The recipient, however, typically selects messages as they become available and has little ability to select particular messages from the queue while ignoring others.

Isolating a tenant in a system using JMS or similar message-based protocols may thus require creating isolated message queues for that tenant's requests, reconfiguring existing components to use the tenant-specific queues or creating new resources that are configured to use the tenant-specific queues. In a large system, particularly in a highly concurrent, queue-driven system, this solution can lead to a large number of message queues being created, resulting in queue management taking up significant resources and reducing overall efficiency.

Due to the difficulties in isolating tenant requests in multi-tenant systems, the common solution to a tenant that causes performance problems or requires isolation is simply to remove the tenant from the multi-tenant environment entirely.

SUMMARY

Embodiments described herein provide systems and methods for isolating requests. One embodiment comprises a processor and a set of computer instructions stored on a non-transitory computer readable medium, the set of computer instructions executable by the processor to provide a processing system. The processing system comprises, a shared command queue, a first virtual computational resources and a second virtual computational resource.

According to one embodiment, the first virtual computational resource comprises a policy engine configured to access policies comprising criteria for assigning commands corresponding to requests from tenants to compartments, determine, according to the policies, compartments to which to assign the commands corresponding to the requests, produce the commands corresponding to the requests, and queue the produced commands in the shared command queue, each produced command comprising compartment assignment information. The policies may include a policy to isolate a tenant's requests to a subscribed compartment.

The second virtual computational resource, according to one embodiment, comprises a command consumer configured to access a subscription to determine a subscribed compartment to which the second virtual computational resource is subscribed, select commands from the shared command queue according to selection criteria that include the subscribed compartment, and consume the selected commands from the shared command queue for processing by the second virtual computational resource.

The processing system may comprise a plurality of virtual computational resources that share the shared command queue, where the plurality of virtual computational resources subscribed to a plurality of compartments. For example, the processing system may comprise a third virtual computational resource in addition to the second virtual computational resource. The third virtual computational resource may be subscribed to a second compartment and comprising a second command consumer. The second command consumer may be configured to select commands from the shared command queue that are assigned to the second compartment and consume the selected commands assigned to the second compartment from the shared command queue for processing by the third virtual computational resource.

The virtual computational resources may cache information that is used to configure processing by the virtual computational resources. According to one embodiment, the first virtual computational resource comprises a policy constraint cache configured to cache the policies. The policy engine can be configured to access the policies from the policy constraint cache. As another example, the second virtual computational resource may comprise a subscription cache for caching the subscription. The second virtual computational resource command consumer can be configured to access the subscription from the subscription cache.

The virtual computational resources can be virtual machines. For example, according to one embodiment, the first virtual computational resource is a first virtual machine, the second virtual computational resource is a second virtual machine and the third virtual computational resource is a third virtual machine.

Multiple virtual computational resources of the processing system may be instances of the same service. For example, the second virtual computational resource and third virtual computational resource can be instances of a same service in one embodiment.

According to one embodiment, the processing system includes a message consumer to consume input messages from a message queue and an output message producer to produce output messages to an output message queue. The input messages may comprise the requests. According to one embodiment, the policy engine and the command consumer are between the message consumer and the message producer in a processing flow of the processing system.

The set of computer instructions may be executable to provide an administrative client having a user interface with controls to allow a user to define compartments, policies or subscriptions.

Another embodiment includes a computer program product comprising a non-transitory computer readable medium storing a set of computer instructions executable by a processor to invoke a first virtual computational resource and second computational resource and configure a second virtual computational resource command consumer to select commands from a first compartment.

According to one embodiment, the first computational resources comprises a policy engine configured to access policies comprising criteria for assigning commands corresponding to requests from tenants to compartments, determine compartments to which to assign the commands corresponding to the requests according to the policies, produce the commands corresponding to the requests, and queue the produced commands in a shared command queue, each produced command comprising compartment assignment information. The policies, according to one embodiment, comprise a policy that isolates a tenant's requests to the first compartment.

According to one embodiment, the second virtual computational resource comprises a second virtual computational resource command consumer configured to access a subscription for the second virtual computational resource to determine a subscribed compartment to which the second virtual computational resource is subscribed, select commands from the shared command queue according to second virtual computational resource command consumer selection criteria that include the subscribed compartment to which the second virtual computational resource is subscribed, and consume the commands selected according to the second virtual computational resource command consumer selection criteria from the shared command queue for processing by the second virtual computational resource.

According to one embodiment, the set of computer instructions are executable to invoke a plurality of virtual computational resources configured to consume commands from the shared command queue and subscribe the plurality of virtual computational resources to a plurality of compartments. For example, according to one embodiment, the set of computer instructions are further executable to invoke a third virtual computational resource comprising a third virtual computational resource command consumer configured to access a subscription for the third virtual computational resource to determine a subscribed compartment to which the third virtual computational resource is subscribed, select commands from the shared command queue according to third virtual computational resource command consumer selection criteria that include the subscribed compartment to which the third virtual computational resource is subscribed, and consume the commands selected according to the third virtual computational resource command consumer selection criteria from the shared command queue for processing by the third virtual computational resource. The instructions may be further executable to configure the third virtual computational resource command consumer to select commands from a second compartment.

Multiple virtual computational resources of the processing system may be instances of the same service. For example, the second virtual computational resource and third virtual computational resource can be instances of a same service in one embodiment.

Invoking virtual computational resources may include invoking virtual machines. For example, according to one embodiment, the first virtual computational resource is a first virtual machine, the second virtual computational resource is a second virtual machine and the third virtual computational resource is a third virtual machine.

As discussed above, the first virtual computational resource may include a policy constraint cache for caching the policies and the policy engine is configured to access the policies from the policy constraint cache. The second virtual computational resource may comprise a subscription cache to cache the subscription for the second virtual computational resource and the second virtual computational resource command consumer can be configured to access the subscription for the second virtual computational resource from the subscription cache.

According to one embodiment, the set of computer instructions are further executable to implement a message consumer to consume input messages from a message queue and an output message producer to produce output messages to an output message queue. The input messages may comprise the requests. The policy engine and the second virtual computational resource command consumer may be between the message consumer and the message producer in a processing flow of a processing system.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 4 is a diagrammatic representation of one embodiment of an operator interface for providing compartment configuration parameters;

FIG. 5A is a diagrammatic representation of one embodiment of an operator interface for configuring compartments;

FIG. 5B is a diagrammatic representation of one embodiment of an operator interface for defining a compartment;

FIG. 5C is a diagrammatic representation of one embodiment of an operator interface for subscribing virtual computational resources to compartments;

FIG. 5D is a diagrammatic representation of one embodiment of an operator interface for summarizing compartments and subscriptions;

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Figure 1:
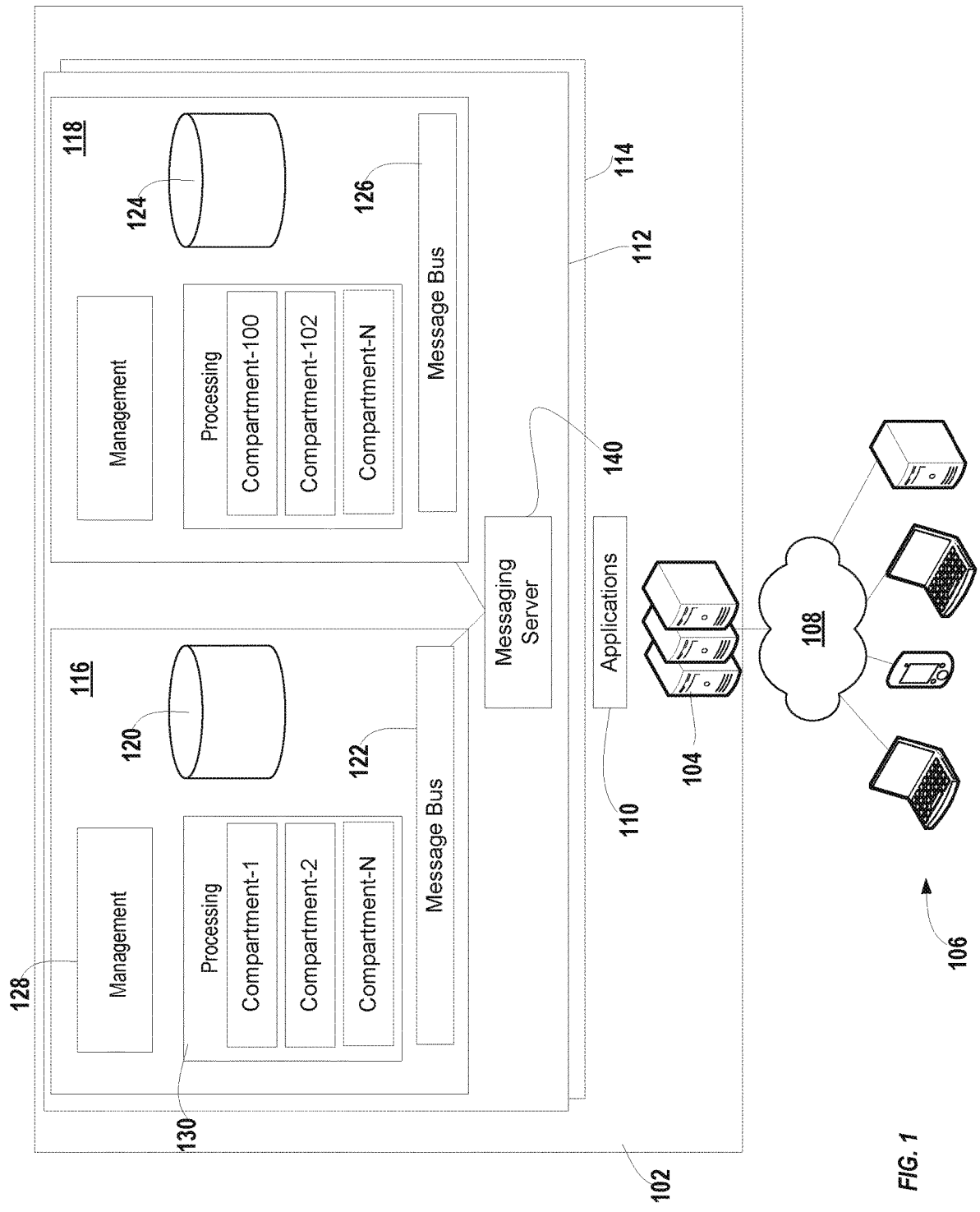
FIG. 1 is a diagrammatic representation of one embodiment of a multi-tenant system.

FIG. 1 is a block diagram illustrating one embodiment of a system 100 that includes a multi-tenant cloud system 102. Multi-tenant system 102 includes servers 104 coupled to clients 106 via a communications network 108, such as a local area network (LAN), wide area network (WAN), and/or the Internet. Resources of multi-tenant system 102 can be shared by tenants. The shared resources may include, but are not limited to, servers, software, virtual computational resources (virtual machines, containers or other virtual computational resources in which code executes), databases, switches and other network devices, physical layer network resources, and other resources. Servers 104 provide front-end applications 110 accessible by clients 106 and backend services to process requests.

Tenants can be limited to sharing back-end resources based on a variety of factors such as geography, scalability of resources or other factors. In the illustrated embodiment, multi-tenant system 102 comprises compute zones 112, 114 that do not share or have very limited sharing of resources. Compute zones may correspond to resources in a particular geographical region and tenants can be assigned to a compute zone based on region.

Certain resources may not scale linearly or otherwise not scale well in a compute zone. To address this problem, such resources may be replicated among execution cells that have a limited number of tenants. Hardware resources and resources that scale well may be shared by execution cells, but resources that do not scale well can be replicated among execution cells. For example, if it is determined that it more efficient to limit the number of tenants that share a database instance and a message bus, execution cells can be created in which these resources are replicated. In FIG. 1, for example, compute zone 112 has execution cells 116, 118 with a database and message bus in each execution cell. Thus, cell 116 includes database 120 and message bus 122 and cell 118 includes database 124 and message bus 126. Each tenant is limited to a particular execution cell and, thus, the resources of an execution cell are shared by a limited number of tenants.

An execution cell may include resources that share the replicated resources. In the illustrated embodiment, for example, execution cell 116 includes management resources 128 and a request processing system 130 that share database 120 and message bus 122. In an embodiment, the management resource 128 manage the execution cell 116 within the multi-tenant cloud system 102. For example, the management services may provide interfaces to configure execution cells, invoke virtual computational resources and perform other management tasks.

Request processing system 130 comprises virtual computational resources that implement a multi-step processing flow to process input requests to process data for tenants. The processing can be dependent on the type of system in which processing system 130 is implemented. For example, if multi-tenant cloud system 102 is a system to exchange electronic document interchange (EDI) documents between entities, processing system 130 may provide services to translate EDI documents between formats used by the entities.

An execution cell may comprise processing compartments, which provide flexible resources that can be used to quickly isolate request processing for a single tenant or subset of tenants to a virtual computational resource. Processing system 130 applies policy compartment constraints to assign requests to processing compartments. Subscriptions specify which computational resources consume commands from which compartments.

Each execution cell within multi-tenant system 102 can provide a user interface to define processing compartments, subscriptions to specify the virtual computational resources to handle requests for compartments, and compartment constraints to specify which requests will be assigned to which compartment. Each execution cell within multi-tenant system 102 may further implement rules to prevent compartments from configured with inadequate resources to handle processing. According to one embodiment, compartments, subscriptions and policy compartment constraints can be dynamically reconfigured without system restart.

In operation, clients 106 associated with multiple tenants interact with applications 110. Based on interaction with an application 110, the application 110 can communicate a request to the appropriate compute zone 112, 114. For a tenant associated with compute zone 112, the application 110 can interface with a messaging server 140 of compute zone 112 to forward a client processing request to messaging server 140. Based on the tenant with which the request is associated, message server produces a message for the request to an input message queue of a request processing system. For requests by tenants assigned to cell 116, messaging server 140 can produce messages to an input message queue of request processing system 130.

Request processing system 130 consumes requests from the input message queue and applies the policy compartment constraints to the requests to assign the requests to compartments. The virtual computational resources of system 130 consume and process the requests for the compartments to which they are subscribed. Request processing system 130 produces output messages for the results to an output queue, which can be read by message server 140. Message server 140 provides responses to the requesting application 110 based on processing results (e.g., based on the output messages).

Virtual computational resources of processing system 130 may share resources of cell 116. Compartments can thus provide the benefits of isolation of single-tenancy while retaining shared resource benefits of multi-tenancy.

Figure 2A:
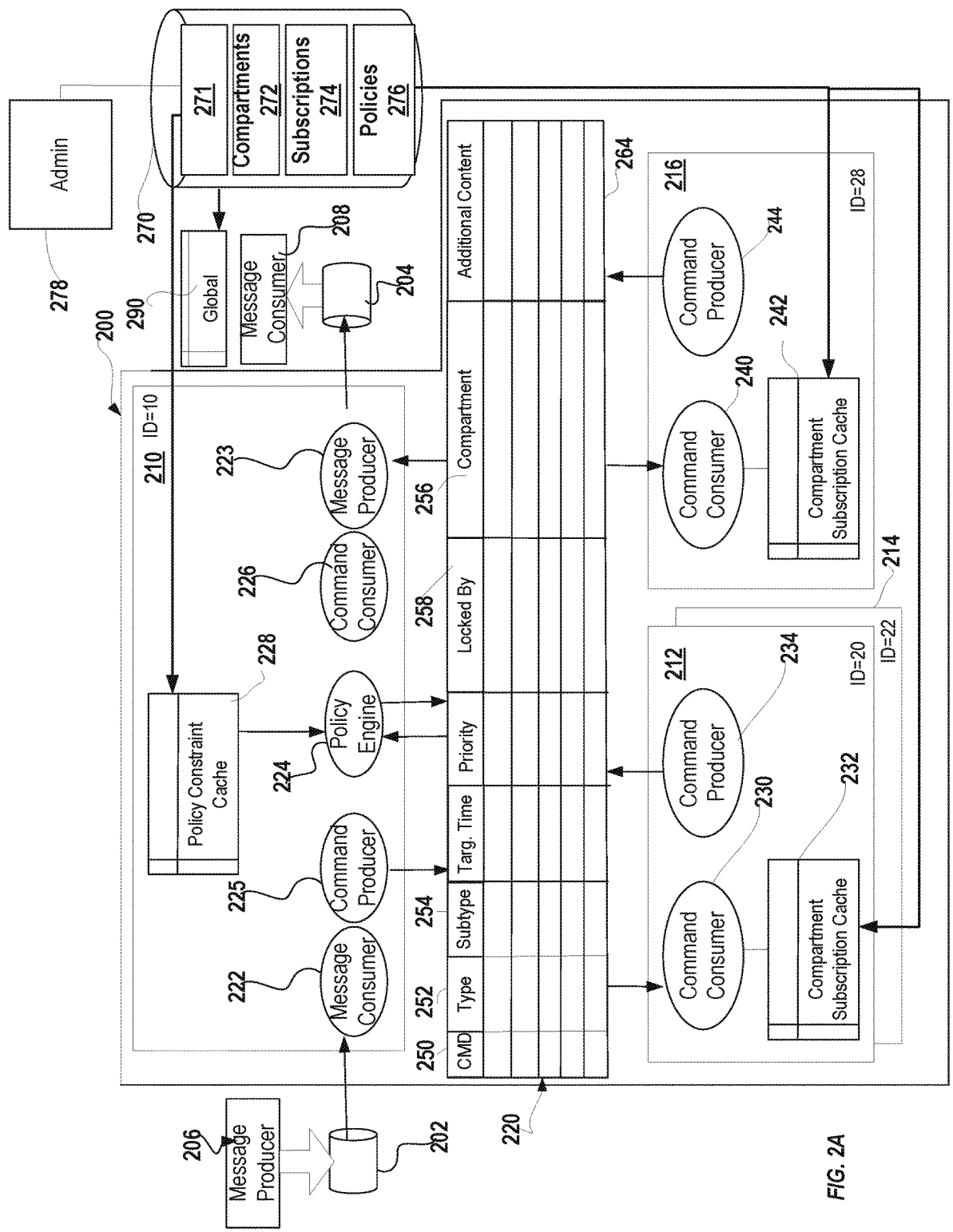
FIG. 2A is a diagrammatic representation of one embodiment of a request processing system.

FIG. 2A illustrates one embodiment of an application system comprising request processing system 200, which may be one embodiment of request processing system 130, coupled to input message queue 202 and output message queue 204. An input message producer 206 produces input messages for consumption by processing system 200. An output message consumer 208 consumes output messages produced by processing system 200. In some embodiments, input message producer 206 and output message consumer 208 are portions of the same application, process or thread.

Input message queue 202 and output message queue 204 provide staging areas that contain messages waiting to be read by message consumers and may reside in volatile memory, persistent storage or a combination thereof. According to one embodiment, input message queue 202 and output message queue 204 are persisted in a database.

The input messages include processing requests for system 200 to process jobs. An input request may include an identification of the tenant of a multi-tenant system for which the request is being processed. For example, in a multi-tenant system, each tenant may be assigned a unique id that identifies that tenant in the system and each input request may contain the unique id for a tenant. An input request may also include additional request information. For example, for an application system configured to translate EDI documents from one electronic format to another, the additional input information may include information relevant to translating a document, such as the location in a data store of the document to be translated, a recipient for the translated document, the type of translation to be performed or other data.

A message may also include priority information that is used by the processing system 200 to prioritize processing based on the input messages. The priority information can include information in the message metadata (e.g., message header) or message payload (e.g., message body). Using the example of a JMS input message, one embodiment of the priority information may include the priority indicated in the priority field of the JMS message header (e.g., 0-9). In addition or in the alternative the body of the message may include priority information. In some implementations, the body of a JMS message may include a service level objective (SLO) for processing the message expressed as a time-to-complete (e.g., three minutes to respond to the input message with the results of a job). The priority information may then include the SLO information.

Processing system 200 is coupled to a data store 270 that stores configuration data used to control processing of input requests. In particular, data store 270 stores compartment system properties 271, compartment definitions 272, subscriptions 274, and policies 276. Compartment system properties 271 specify whether compartment processing is enabled and limitations on compartment definitions and subscriptions. Compartment definitions 272 define processing compartments, which provide flexible resources that can be used to quickly isolate request processing for a single tenant or subset of tenants to a virtual computational resource. Subscriptions 274 define the virtual computational resources that process requests from processing compartments. According to one embodiment, a subscription is a defined association between a virtual computational resource identifier and a compartment. Policies 276 include policy compartment constraints that provide rules for assigning processing requests to processing compartments.

Configuration information may be pushed to various caches for quicker retrieval. According to one embodiment, compartment system properties 271 are pushed to a global cache 290, policies 276 are pushed to a policy constraint cache 228 and subscriptions 274 are pushed to subscription caches (subscription caches 232, 242). Global cache 290, policy constraint cache 228, and the subscription caches may reside in volatile memory, persistent storage or a combination thereof. Global cache 290, policy constraint cache 228, and the subscription caches reside in volatile memory.

Processing system 200 implements a multi-step processing flow to process input requests to generate results. Processing an input request may include processing an input message containing the request and a number of commands corresponding to the input request. In this context, a command may be said to correspond to an input request if the command was produced by processing system 200 as part of the processing flow of processing that input request to generate a result. Results may include output messages (e.g., responses), job processing results or other results.

Processing system 200 comprises a plurality of virtual computational resources, such as virtual machines (e.g., Java Virtual Machines (JVMs) or other virtual machines), containers or other virtual computational resources that execute code, to implement the processing flow. In FIG. 2A, processing system 200 is illustrated with virtual computational resources 210, 212, 214, 216, though it will be appreciated that a processing system may comprise any number of virtual computational resources and that virtual computational resources may be created or destroyed as needed.

According to one embodiment, each virtual computational resource of request processing system 200 runs as a separate process. Each virtual computational resource may be an instance of a service. According to one embodiment, each virtual computational resource 210, 212, 214, 216 may be a separate JVM. In some cases, multiple virtual computational resources may be instances of the same service. That is, multiple virtual computational resources may execute the same code. For example, virtual computational resources 212, 214 may be separate JVMs that load and execute the same classes. Each virtual computational resource has a resource identification to identify that virtual computational resource in an environment.

The components of virtual computational resources can pass commands corresponding to input requests to other components of request processing system 200 via a shared command queue 220. Command queue 220 may reside in volatile memory, persistent storage or a combination thereof. According to one embodiment, command queue 220 may comprise a database table.

A command is a request for processing by a next step in the processing flow and may be a message formatted according to a format that is known by command consumers of processing system 200. A command can include command metadata and a command body. In the embodiment illustrated, each command includes fields for a command id 250, a message type (in this example, a type 252 and subtype 254), a compartment 256 and a lock status 258. A command may also include additional command content 264.

The message type and subtype specify the type of command to be processed. The message type 252 and message subtype 254 are used internally by command consumers to select commands. Multiple command consumers can be configured to consume the same type of command. For example, if virtual computational resource 212 and virtual computational resource 214 provide instances of the same service, they may include command consumers configured to consume commands having the same combination of type 252 and subtype 254. The lock status 258 is used to prevent another consumer from consuming a command that has already been consumed from queue 220. Lock status 258 indicates that a consumer has picked up the command from queue 220 and may identify the consumer. The command may have a null or other lock status when initially enqueued to indicate that the command has not yet been picked up by a command consumer.

The compartment 256 for a command specifies the compartment to which the command was assigned by policy engine 224. Policies 276 include compartment constraints that provide criteria for assigning commands to processing compartments. A policy can specify, for example, assignment to a compartment based on data associated with a request including data from the request, obtained in processing the request or produced in processing the request. For an application system that translates EDI documents, for example, a policy 276 may specify a compartment assignment based on a tenant, SLO, recipient, document location or other data associated with an input request.

As discussed below, virtual computational resources can be subscribed to compartments such that they consume commands from only the compartments to which they are subscribed. Compartments may be used then to isolate processing of certain commands to particular virtual computational resources when there are multiple virtual computational resources that can otherwise consume the commands.

Returning to command queue 220, the command metadata may include a target time and a priority. According to one embodiment, processing system can prioritize commands as described in U.S. patent application Ser. No. 15/956,556, entitled "Producer-Side Prioritization of Message Processing," which is hereby fully incorporated by reference herein in its entirety.

Additional command content 264 can include other data (e.g., metadata or command body) used by subsequent command consumers, producers or other components as part of the processing flow to generate a result for a message. The additional command content 264 for a command is dependent on the application system in which embodiments are implemented and may comprise one or more portions of the corresponding input message, data obtained by processing system 200 or data produced by the processing system 200. The additional command content 264 may include information from an input message, including information from an input request or information retrieved or produced based on an input request. For example, for an application system configured to translate EDI documents from one electronic format to another, the additional command content may include the tenant id for the document sender, the location of the document to be translated, a recipient for the translated document, the type of translation or other data.

As discussed below, command consumers select commands from queue 220 for consumption based on various selection criteria. Frequently queried fields of queue 220 may be indexed. For example, indexes may be created on one or more of message type 252, subtype 254 or compartment 256. Indexing attributes that are frequently queried against improves the speed of selecting and consuming commands by command consumers.

The virtual computational resources of processing system 200 include consumers to consume messages or commands and producers and produce messages or commands. A single application, process or thread of a virtual computational resource may act as both a consumer and producer. Preferably, however, each producer is a separate application, process or thread from subsequent consumers in the processing flow. A producer, for example, may be a thread of a virtual computational resource process while subsequent consumers are separate threads of the same process or threads of at least one additional process. Producers and consumers in a processing flow may be distributed among virtual computational resources, for example, in a cloud computing environment.

In the illustrated embodiment, virtual computational resources of processing system 200 includes an input message consumer 222, an output message producer 223, a policy engine 224, command producers to produce commands to command queue 220 (e.g., command producers 225, 234, 244) and command consumers to consume commands from command queue 220 (e.g., command consumers 226, 230, 240). According to one embodiment, input message consumer 222, output message producer 223, policy engine 224, the command producers and command consumers can each be implemented as objects.

Input message consumer 222 is an application, process or thread of a virtual computational resource 210 configured to consume input messages from input message queue 202. According to one embodiment, input message consumer 222 comprises a JMS selector configured to scan input message queue 202 and select messages based on selection criteria including, but not limited to, the priority level 0-9 indicated in the JMSPriority field of the messages. Input message consumer 222 may be configured to further obtain data from other sources, process data from the input messages or other sources and pass data, including the message priority information, to the subsequent command producer 225.

Output message producer 223 is an application, process or thread within a process that produces output messages to output message queue 204. The output messages, according to one embodiment, may be responses to the input messages. The output messages may indicate, for example, results of requested jobs.

Each command producer (e.g., command producers 225, 234, 244 and policy engine 224) is an application, process or thread of a virtual computational resource configured to process data from a consumer and produce commands that correspond to input messages. Command producers may be configured to further obtain data from other sources, process data from a message consumer or command consumer or data received from other sources. The command producers produce commands to command queue 220, which is a staging area holding commands waiting to be read by command consumers.

Each command consumer (e.g., command consumers 226, 230, 240 and policy engine 224) is an application, process or thread of a virtual computational resource configured to select commands from command queue 220 for processing. Command consumers may further process data from commands, data obtained by the command consumers or data produced by the command consumers. Command consumers can pass data, including compartments and priority information to subsequent producers using data queues or other techniques for passing data in a virtual computational resource.

Each command consumer comprises a command selector configured to select commands from command queue 220 based on selection criteria. According to one embodiment, each command consumer (e.g., command consumers 226, 230, 240, policy engine 224) scans queue 220 to identify candidate commands that meet selection criteria for that command consumer. For example, policy engine 224 may identify commands that meet a first set of selection criteria as command consumable by policy engine 224, command consumer 230 may identify commands that meet a second set of selection criteria as commands consumable by command consumer 230, and command consumer may identify commands that meet a third set of selection criteria as commands consumable by command consumer 240, where the first set of selection criteria, second set of selection criteria and third set of selection criteria are different. In some cases, command consumers of multiple virtual computational resources may apply the same selection criteria.

In one embodiment, each command consumer is configured with base selection criteria. For example, each command consumer can apply a select, such as:
SELECT From command_queue WHERE target_time<current_time, locked_by=null, type=[type] AND subtype=[subtype].

If processing compartments are enabled, a command consumer that supports compartments can use additional WHERE clauses to select commands for subscribed compartments, for example:
SELECT From command_queue WHERE target_time<current_time, locked_by=null, type=[type] AND subtype=[subtype] AND (compartment=[subscribedcompartment1] OR compartment=[subscribedcompartment2] . . . ).

Having identified consumable commands that meet the selection criteria, the command consumer selects the consumable commands to consume. In one embodiment, a command consumer selects and locks all of the identified consumable commands for processing by that command consumer. In another embodiment, a command consumer may apply a selection rule to determine how many commands to select from queue 220 for consumption. For example, a command consumer may select a number of commands to consume based on demand as described in U.S. patent application Ser. No. 15/956,556, entitled "Producer-Side Prioritization of Message Processing," filed Apr. 18, 2018. Prior to selecting commands for consumption, a command consumer may apply an ordering rule to order consumable commands based on one more ordering criteria. For example, a command consumer can order candidate commands based on target time, priority, target time first and then priority, priority first then target time. In such an embodiment, the commands may be consumed in the determined order.

Policy engine 224 is an application, process or thread of a virtual computational resource that assigns requests to compartments. According to one embodiment, policy engine 224 comprises a command consumer and a command producer. The command consumer of policy engine 224 scans command queue 220 for commands meeting policy engine selection criteria. For example, policy engine 224 may scan queue 220 for commands with expired target times, that are not locked by a consumer, and that have a first combination of message type and subtype.

In one embodiment, policy engine 224 first queries command queue 220 for a list of candidate commands that have expired target times and are not locked by a consumer. Policy engine 224 groups the candidate commands by message and message subtype, selects the consumable commands that meet the selection criteria of policy engine 224 (e.g., for example, the commands that have the first combination of message type and subtype), consumes the selected commands from command queue 220 and processes the selected commands to generate the next commands corresponding to the requests in the input messages.

Policy engine 224 produces commands based on the policies 276. Policies may include compartment constraints that provide criteria for assigning commands corresponding to requests to compartments. To make the process of applying policies more efficient, virtual computational resource 210 comprises a policy constraint cache 228 that caches policies. Policy engine 224 accesses policies from the policy constraint cache 228. Policy constraint cache 228 may reside in volatile memory, persistent storage or a combination thereof. In one embodiment, policy constraint cache 228 is persisted in a volatile memory.

Policy engine 224 uses the information in a selected command (that is a command consumed from command queue 220) to look up policy information and, based on the policy information, determines a message type and subtype for the next command. For example, the command may indicate that a certain type of document translation is to be performed and policy engine 224 can assign the next command a message type and subtype so that the next command will be picked up by a virtual computational resource 212, 214, 216 that performs the specified type of translation.

Further, as part of producing a next command corresponding to the input request, policy engine 224 can apply policy compartment constraints to determine a processing compartment to which to assign the command. If the information from the selected command does not meet the policy compartment constraints, the policy engine 224 can assign the next command to a default compartment.

According to one embodiment, policy engine 224 may check whether compartment processing is enabled (e.g., from global cache 290). If compartment processing is not enabled, policy engine 224 ignores compartment constraints and either does not assign commands to compartments (e.g., compartment 256 is null) or assigns commands to a default compartment. In another embodiment, policy engine 224 continues to assign commands to compartments according to policy compartment constraints when compartment processing is not enabled, but downstream command consumers ignore the compartment assignments.

The next command corresponding to an input request (i.e., the command produced by policy engine 224) can be sent to command queue 220. The command metadata can include the message type, subtype and compartment assigned by the policy engine 224. The command may also include a target time determined for the command and priority information for the command (e.g., JMSPriority field value, SLO or other priority information from the corresponding input message) along with other information (e.g., information relevant to the processing job to be performed).

Command consumers 230, 240 (and the command consumer of virtual computational resource 214) can be configured to select commands based on selection criteria that includes a subscribed compartment. According to one embodiment, when command consumer 230 or command consumer 240 is called, the command consumer determines if compartment processing is enabled (e.g., from global cache 290) and, if so, accesses a subscription for the corresponding virtual computational resource 212, 216 to determine if compartment processing is enabled and a subscribed compartment to which the virtual computational resource is subscribed.

If compartment processing is enabled, but the virtual computational resource is not subscribed to another compartment, the command consumer uses a default compartment. For example, the command consumer may select commands according to:
SELECT From command_queue WHERE target_time<current_time, locked_by=null, type=[type] AND subtype=[subtype] AND WHERE compartment=Default.

If compartment processing is enabled and the virtual computational resource is subscribed to a compartment, the command consumer uses the subscribed compartment as a selection criterion. For example, the command consumer may select commands according to:
SELECT From command_queue WHERE target_time<current_time, locked_by=null, type=[type] AND subtype=[subtype] AND WHERE compartment=[subscribedcompartment].

Thus, command consumer 230 will only consume commands assigned to the compartment to which virtual computational resource 212 is subscribed and command consumer 240 will only consume commands assigned to the compartment to which virtual computational resource 216 is subscribed.

If compartment processing is not enabled, the command consumer selector does not use a compartment as a selection criteria.

A virtual computational resource may comprise a compartment subscription cache that caches a subscription. For example, virtual computational resource 212 comprises cache 232 and virtual computational resource 216 comprises cache 242. Command consumer 230 can thus access the subscription for virtual computational resource 212 from cache 230 and command consumer 240 can access the subscription for virtual computational resource 216 from subscription cache 242. A subscription cache may reside in volatile memory, persistent storage or a combination thereof. In one embodiment, subscription cache 232 and subscription cache 242 are persisted in a volatile memory.

An admin component 278 monitors which virtual computational resources are running and provides an interface (e.g., web-based interface, command line interface or other interface) to allow a user at a client computer to provide configuration data, such as compartment system properties 271, compartment definitions 272, subscriptions 274, policies 276 and configuration data for other aspects of processing system 200. Configuration data can be stored in a configuration database or other configuration data store 270.

At least some of the configuration data may be pushed to cache. For example, policies can be pushed to policy constraints cache 228 for access by policy engine 224. Similarly, the subscription for a virtual computational resource can be pushed to a subscription cache for access by a command consumer. According to one embodiment, an indication of whether compartment processing is enabled can be pushed to global cache 290.

Admin component 278 may provide rules to ensure that no compartment can be configured with inadequate resources to handle processing. For example, the admin component 278 may require that a minimum number of virtual computational resources be subscribed to a compartment. This can help ensure that commands assigned to a compartment get processed even if a virtual computational resource subscribed to the compartment fails.

FIG. 2B, FIG. 2C, FIG. 2D and FIG. 2E provide diagrammatic representations of one embodiment of request processing system 200 processing an input request. In this example, it is assumed that i) policy engine 224 selects unlocked commands having type A1 and an expired target time, ii) command consumer 230 selects unlocked commands having type B1, an expired target time and an assigned compartment of VIP, iii) command consumer 240 selects unlocked commands having type B1, an expired target time and that are assigned to default compartment, and iv) command consumer 226 selects unlocked commands having type C1, an expired target time and an assigned compartment of VIP.

Figure 2B:
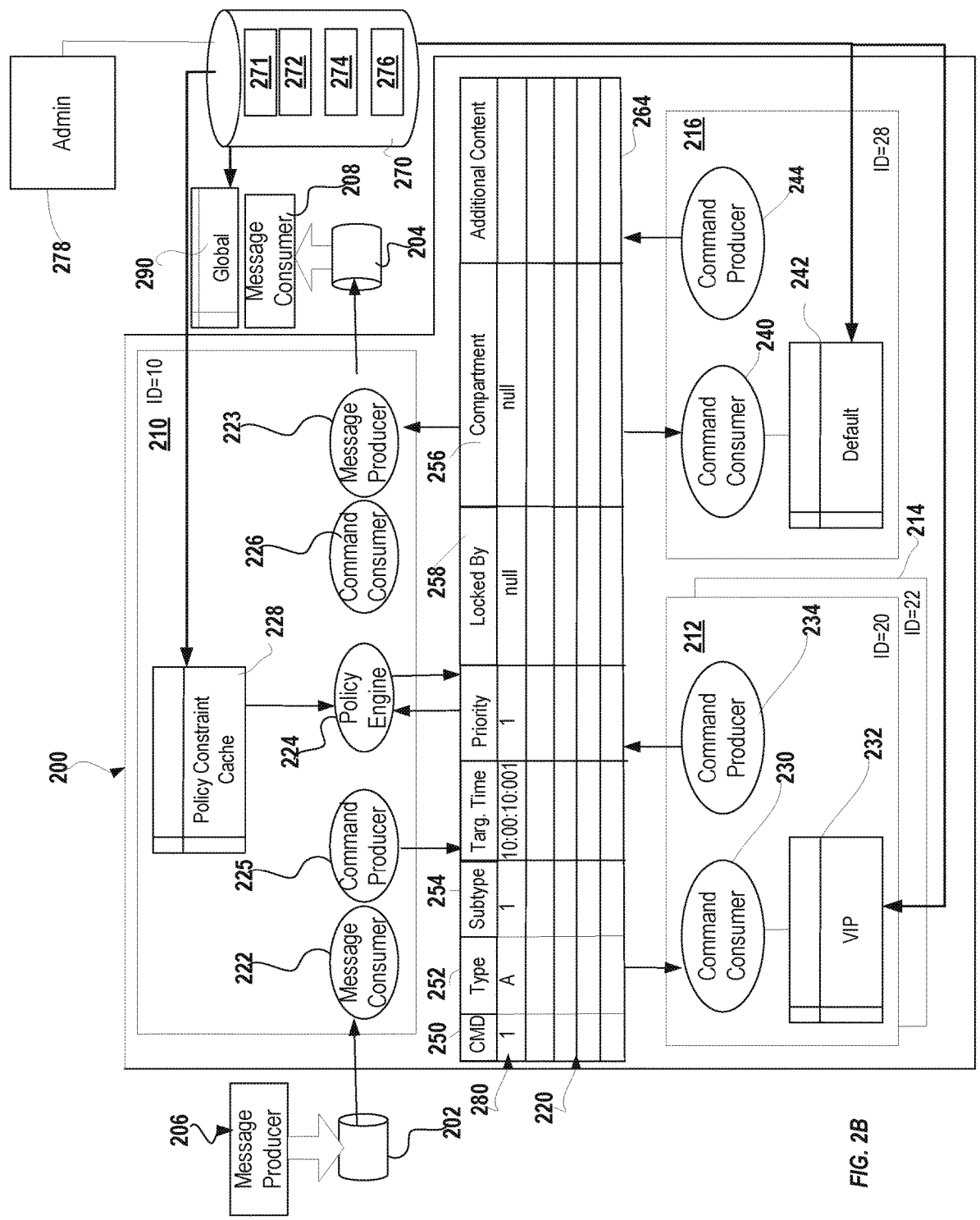
FIG. 2B is a diagrammatic representation of the request processing system of FIG. 2A in which a command has been produced to a command queue according to one embodiment.

With reference to FIG. 2B, message consumer 222 consumes an input message containing an input request from message queue 202 and passes information from the input message to command producer 225 using a data queue or other technique. Command producer 225 produces command 280 corresponding to the input request and sends the command to queue 220. The command will have a message type and subtype so that it gets consumed by policy engine 224. Further, the command content 264 may include information from the input request, such as a tenant, the processing job requested or other information. At this point no compartment is assigned.

Figure 2C:
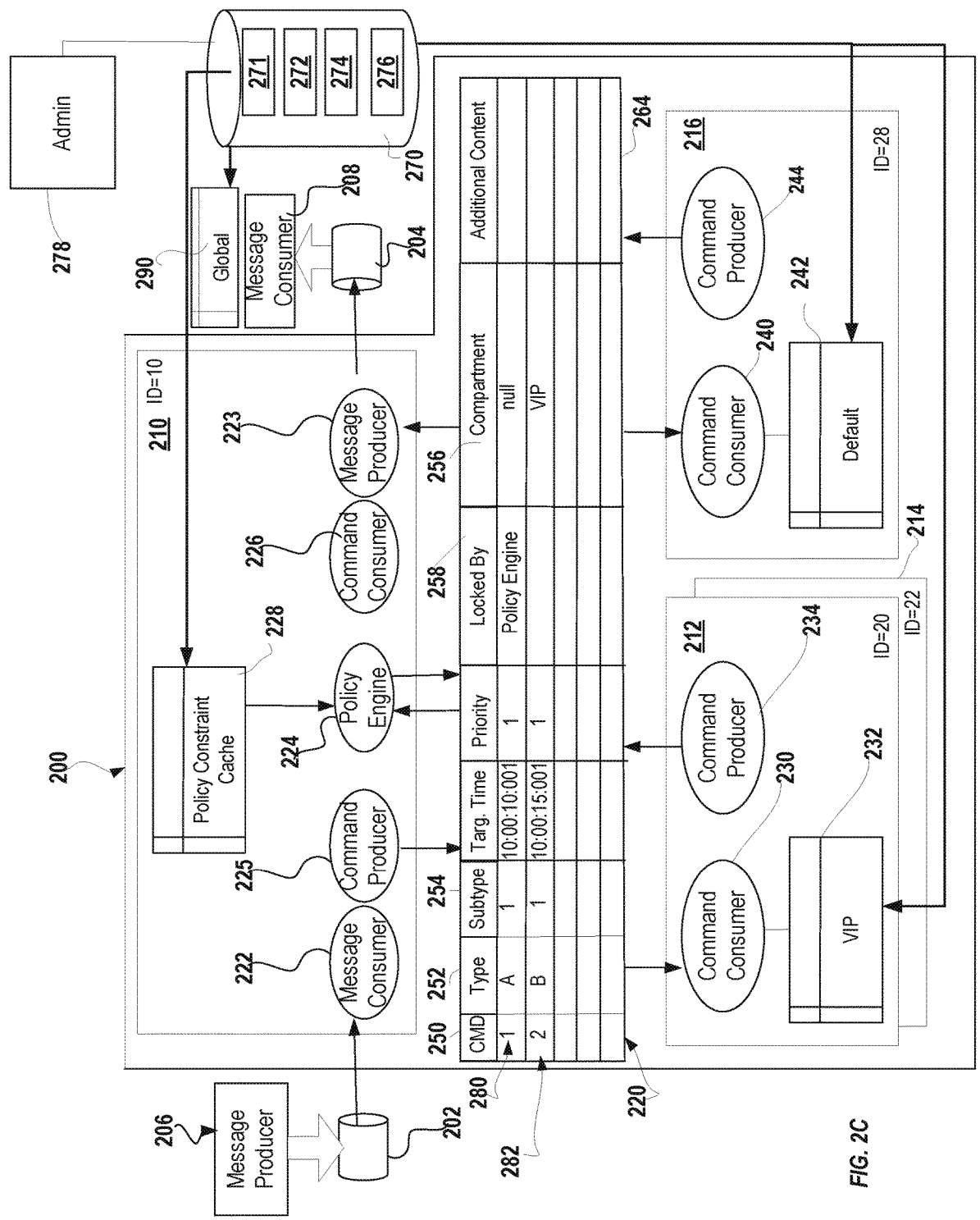
FIG. 2C is a diagrammatic representation of the request processing system of FIG. 2A in which a command has been assigned to a compartment according to one embodiment.

With reference to FIG. 2C, policy engine 224 consumes command 280 from queue 220, accesses policy constraints from policy constraint cache 228, and based on the policy constraints, produces a new command 282 corresponding to the input request, the new command having a new message type so that it is consumed by a next step in the processing flow. Command 282 in this example is assigned to a "VIP" compartment based on compartment constraints.

Figure 2D:
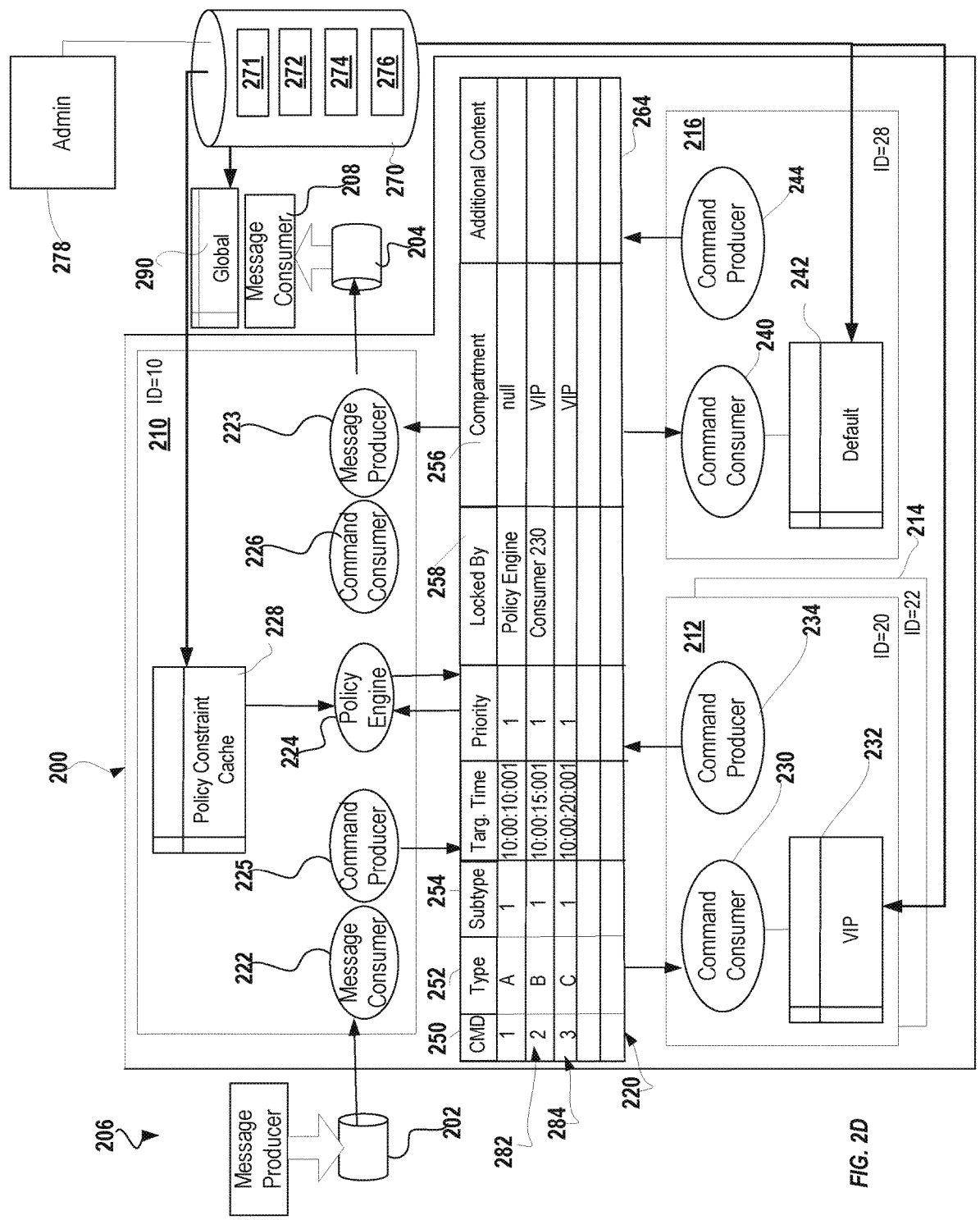
FIG. 2D is a diagrammatic representation of the request processing system of FIG. 2A in which a second command has been assigned to a compartment according to one embodiment.

Turning to FIG. 2D, command consumers 230 and 240 check the respective subscription caches 232, 242 to determine the compartments to which virtual computational resource 212 and virtual computational resource 216 are respectively subscribed. In this example, command consumer 230 will determine that virtual computational resource is subscribed to VIP, and will use compartment=VIP as a selection criteria. Command consumer 240, on the other hand, will use compartment=default in the selection criteria. Command consumers 230, 240 scan queue 220 for commands that meet the selection criteria of the command consumer, including the subscribed compartment to which the respective virtual computational resource 212, 216 is subscribed (if any). In this example, command consumer 230 consumes command 282. Command consumer 230 passes information from command 282, including the assigned compartment, to command producer 234 using data queues or other techniques. Command producer 234 produces a new command 284 corresponding to the input request and includes the assigned compartment in the command. The additional content 264 for the command 284 may include information determined from processing information in command 282.

Figure 2E:
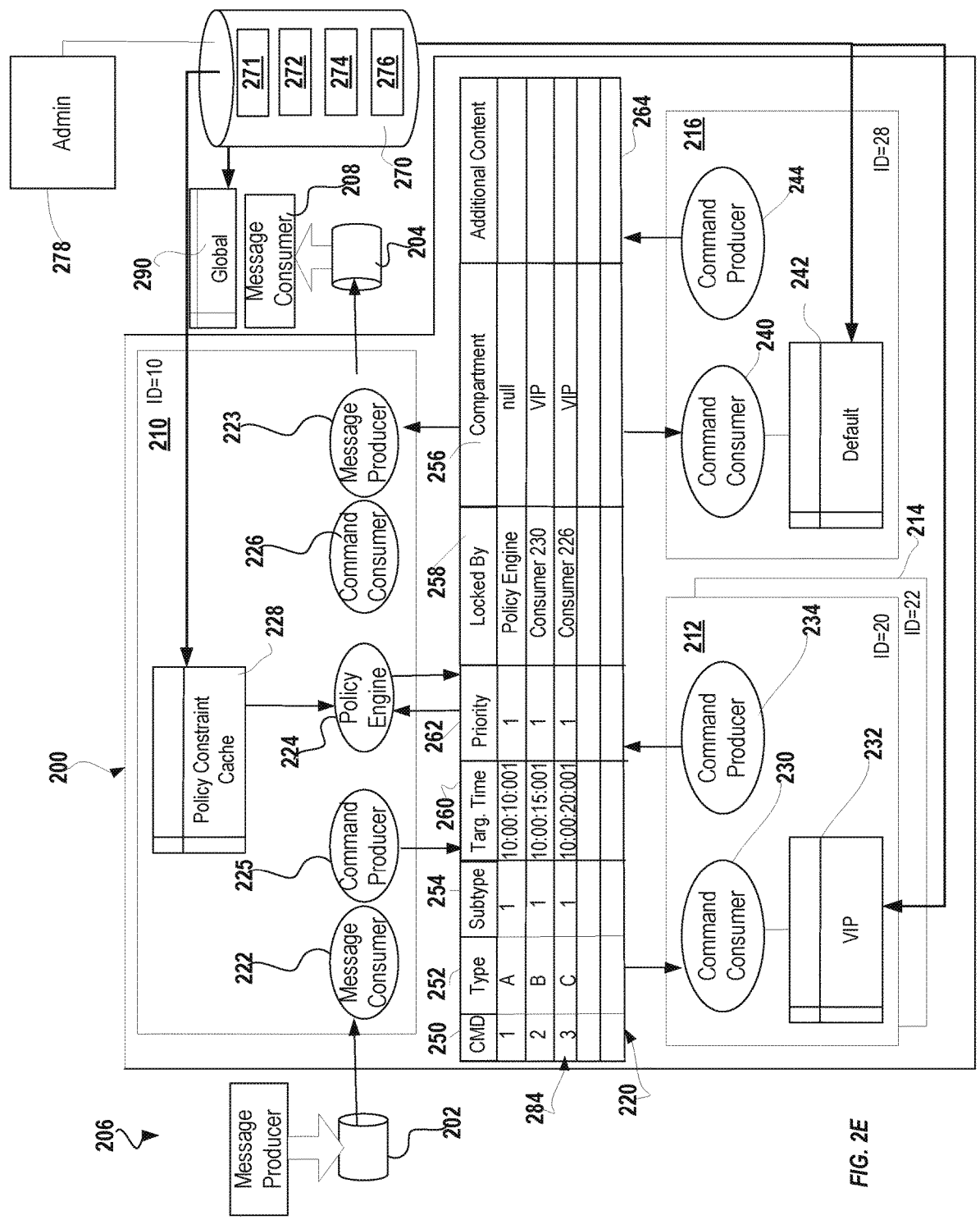
FIG. 2E is a diagrammatic representation of the request processing system of FIG. 2A in which the second command has been consumed.

In FIG. 2E, command consumer 226 consumes command 284 and passes information from command 284 to output message producer 223. Output message producer 233 produces an output message to output message queue 204.

Figure 3:
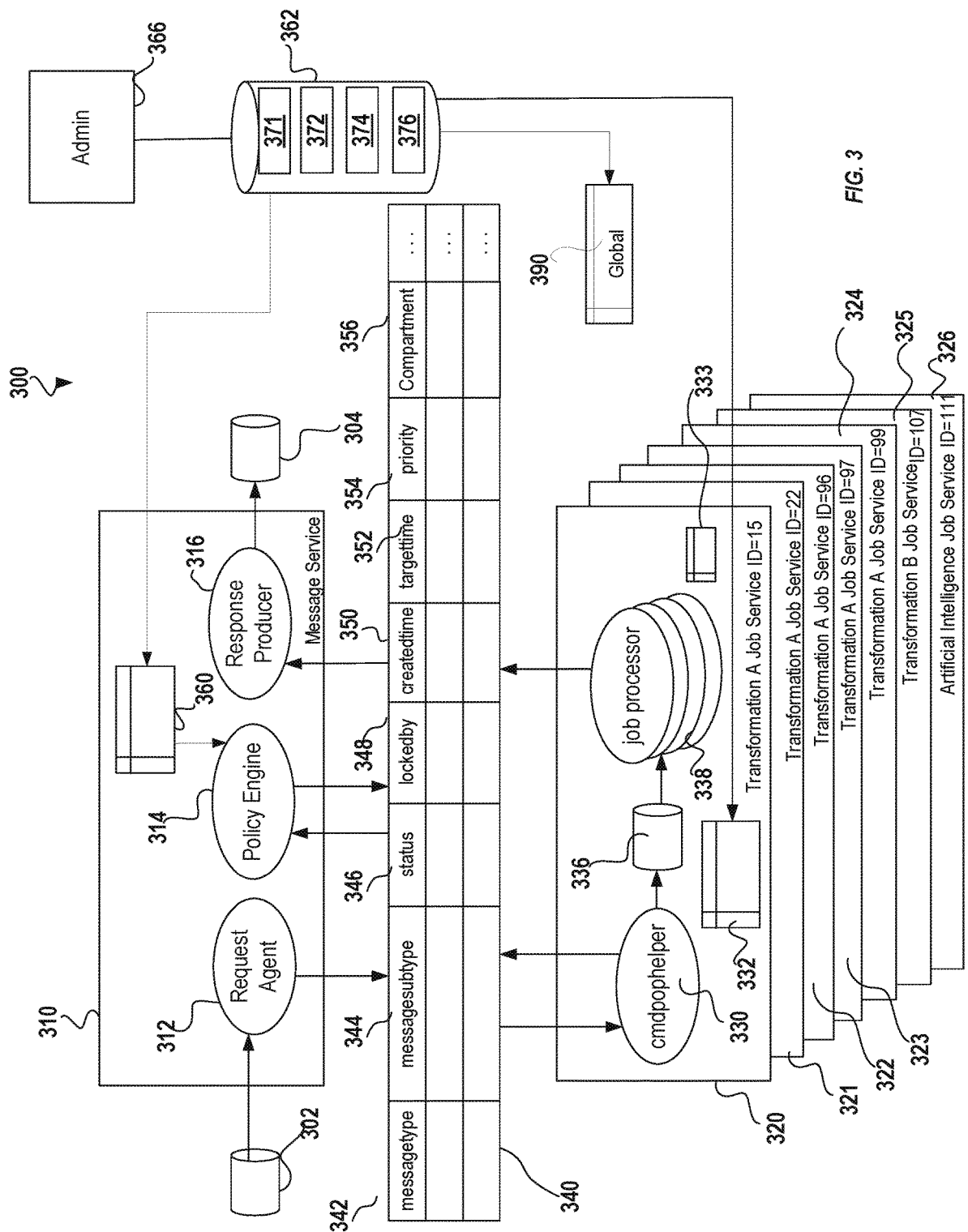
FIG. 3 is a diagrammatic representation of another embodiment of a request processing system.

A request processing system according to the teachings herein, such as request processing system 200, may be implemented in a wide variety of systems to isolate request processing to specified virtual computational resources. For example, FIG. 3 is a diagrammatic representation of one embodiment of a request processing system 300 for processing requests to perform jobs. More particularly, system 300 processes requests to translate documents between electronic formats used by various entities. In this example, the requests may be JMS messages that include, for example, an indication of a sender (tenant), an indication of a recipient, and a location in a database, file system or other data store of a document to translate. A response may be a JMS message that includes data indicating a location in a database, file system or other data store of the translated document and other data related to a request.

System 300 includes virtual computational resources 310, 320, 321, 322, 323, 324, 325, 326. Each of virtual computational resources 310, 320, 321, 322, 323, 324, 325, 326 runs as a separate process and has an id to identify that process. According to one embodiment, each of virtual computational resources 310, 320, 321, 322, 323, 324, 325, 326 is a separate JVM and each JVM has a unique service id, at least within the context of system 300.

In the embodiment illustrated, virtual computational resource 310 provides a message service and is referred to below as message service 310. Virtual computational resources 320, 321, 322, 323, 324, 325 implement various types of document transformations, for example, translating EDI documents from an EDI format used by a sender to an EDI format used by a recipient. In particular, virtual computational resources 320, 321, 322, 323, 324 provide a service to perform a first type of transformation and are referred to herein as transformation A job services 320, 321, 322, 323, 324. Transformation A job services 320, 321, 322, 323, 324 may be instances of the same service. That is, they may be, for example, JVMs executing the same classes. Virtual computational resource 325 is configured to perform a second type of transformation and is referred to herein as transformation B job service 325. Virtual computational resource 326 is configured to perform artificial intelligence-based analytics and is referred to herein as AI job service 326. Message service 310 and job services 320, 321, 322, 323, 324, 325, 326 may be distributed, for example, in a cloud computing environment.

Message service 310 is coupled to an input message queue 302 and output message queue 304. Input message queue 302 and output message queue 304 are staging areas that contain messages waiting to be read by message consumers. Input message queue 302 and output message queue 304 may reside in volatile memory, persistent storage or a combination thereof. According to one embodiment, input message queue 302 and output message queue 304 are persisted in a database.

Message service 310 communicates commands to job services 320, 321, 322, 323, 324, 325, 326 using a shared command queue 340, which is a staging area holding commands waiting to be read by command consumers. Command queue 340 may reside in volatile memory, persistent storage (e.g., a database or other data store) or a combination thereof.

In the embodiment illustrated, each command in command queue 340 includes a message type 342, a message subtype 344, a status 346, a lock status 348, a created time 350, a target time 352, a priority 354 and a compartment 356 and other command content. One or more values may be null. The message type 342, message subtype 344 and compartment 356 are used internally by command consumers to select commands. Status 346 may be any status that is to be passed to command consumer. Locked status 348 indicates whether a message consumer has picked up the command from command queue 340. Created time 350 indicates the time the command was created. Target time 352 indicates an earliest time that the next command consumer should pick up the command from queue 340. Priority 354 may contain priority information from a corresponding input message. Compartment 356 specifies the compartment to which a command has been assigned. Command attributes may be indexed. For example, indexes may be created on one or more of message type 342, subtype 344 or compartment 356.

Message service 310 comprises a request ingest agent thread (request agent 312), a policy engine thread (policy engine 314) and a response producer thread (response producer 316). Request agent 312 comprises a message input consumer that applies selection criteria to select input messages from input queue 302. According to one embodiment, request agent comprises a JMS selector configured to select messages based on selection criteria including, but not limited to, the priority level 0-9 indicated in the JMSPriority field of the messages. Message service 310 may include multiple request agents 312, each configured to select input messages based on selection criteria. For example, one request agent 312 may be configured to select messages having priorities 0-7 and another request agent to select input messages having priorities 8-9.

Request agent 312 comprises a command producer and processes an input message (a request) to generate a corresponding command that can be consumed by a subsequent command consumer. The command includes data corresponding to the request, such as data extracted from the corresponding message or data obtained or produced by request agent 312 based on the corresponding message. According to one embodiment, the command can be assigned a message type and subtype so that it will be picked up by policy engine 314. The command further includes a target time determined for the command and the priority information from the corresponding request (e.g., JMSPriority field value, SLO or other priority information). The additional command content of the command may include job request data, such as pointers to data about the tenant (sender), receiver and document to be translated.

Policy engine 314 comprises a command consumer and a command producer. Policy engine 314 is configured to scan command queue 340 for commands with expired target times, that are not locked by a consumer and have a first combination of message type and subtype. According to one embodiment, policy engine 314 queries command queue 340 for a list of candidate commands that have expired target times and are not locked by a consumer. Policy engine 314 may group the candidate commands by message and message subtype and identify the consumable commands that meet the selection criteria of policy engine 314 (e.g., for example, the commands that have a first combination of message type and subtype). Policy engine 314 selects consumable commands meeting the selection criteria of policy engine 314 from command queue 340 and processes the selected commands to generate the next commands corresponding to the input requests.

Policy engine 314 produces command corresponding to the input message based on the policies. According to one embodiment, policy engine 314 accesses policies from a policy constraint cache 360 of message service 310. Policy constraint cache 360 may reside in volatile memory, persistent storage or a combination thereof. In one embodiment, policy constraint cache 360 is persisted in a database.

As part of processing a selected command corresponding to an input message to produce a next command corresponding to the input message, policy engine 314 uses the information in a consumed command corresponding to an input request to look up policy information based on the sender and receiver indicated in the input request and, based on the policy information, determine a job service type to process the job indicated in the corresponding input request. Policy engine 314 sets the message type and subtype so that the command is picked up by the appropriate type of job service. Further, policy engine 314 can apply policy compartment constraints to information in a selected command to generate the next command. For example, policy engine 314 may retrieve sender, recipient or other information specified in the selected command, compare the information to the policy compartment constraints and if the information meets the criteria for assigning a command to a compartment, assign the command being produced to the specified compartment. If the information from a selected command does not meet criteria for assigning commands to a compartment, policy engine 314 can assign the command to a default compartment. Policy engine 314 can further apply prioritization rules to the priority information in the selected command to determine a target time for the next command.

According to one embodiment, policy engine 314 checks global cache 390 to determine whether compartment processing is enabled. Global cache 390 may reside in volatile memory, persistent storage or a combination thereof. In one embodiment, global cache 390 is persisted in a database.

If compartments are not enabled, policy engine 314 ignores compartment constraints and either does not assign commands to compartments (e.g., compartment 356 is null) or assigns commands to a default compartment. In another embodiment, policy engine 314 continues to assign commands to compartments according to policy compartment constraints even when compartment processing is not enabled, but downstream command consumers ignore the compartment assignments.

Policy engine 314 sends the next command corresponding to an input message to message queue. The command includes the combination of message type, subtype determined by the policy engine 314, the compartment determined by policy engine 314, target time determined for the command and priority information for the command (e.g., JMSPriority field value, SLO or other priority information from the corresponding input message) along with other information.

Response producer 316 comprises a command consumer and a message producer. Response producer 316 is configured to watch command queue 340 for commands with expired target times, that are not locked by another consumer and have a second combination of message type and subtype. According to one embodiment, response producer queries command queue 340 for a list of candidate commands that have expired target times and are not locked by a consumer. Response producer 316 may group the candidate commands by message and message subtype and identify the commands that meet the selection criteria of response producer 316 (e.g., for example, the commands that have a second combination of message type and subtype). Response producer 316 selects commands meeting the selection criteria of response producer 316 from command queue 340 and processes the selected commands to generate response messages corresponding to the input messages. For example, response producer 316 may use the information in a command corresponding to an input message to generate an output message that points to the results of a processing job. The output message can be output to output message queue 304 where it can be picked up by another component.

Job services 320, 321, 322, 323, 324, 325, 326 perform a bulk of the job processing. As discussed above, transformation A job services 320, 321, 322, 323 and 324 may be configured to perform a first type translation, transformation B job service 325 may be configured to perform a second type of translation and job server 326 may be configured to perform analytics. Job service 320 comprises a cmdpophelper thread 330, a local queue 336 and a thread pool 338 of job processor threads. Job services 320, 321, 322, 323, 324, 325, 326 may implement a similar series of threads, but are configured consume different commands than job service 320 and perform different translations or operations.

Cmdpophelper thread 330 comprises a command consumer configured to select commands from command queue 340 based on selection criteria including message type, message subtype and subscribed compartment. More particularly, when called, cmdpophelper thread 330 determines if compartment processing is enabled from global cache 390 and queries a subscription cache 332 of job service 320 to determine if job service 320 is subscribed to any compartments. Subscription cache 332 may reside in volatile memory, persistent storage or a combination thereof. In one embodiment, subscription cache 332 is persisted in a database.

The Cmdpophelper thread 330 queries command queue 340 for a list of candidate commands that have expired target times and are not locked by a consumer. Cmdpophelper thread 330 may group the candidate commands by message type and message subtype and identify the commands that meet the selection criteria of cmdpophelper thread 330 (e.g., for example, the commands that have a third combination of message type and subtype and a subscribed compartment). If compartment processing is enabled, but transformation A job service 320 is not subscribed to a compartment, the cmdpophelper thread 330 uses a default compartment as a selection criteria. If compartment processing is not enabled, cmdpophelper thread does not use a compartment as a selection criteria.

Cmdpophelper thread 330 is further configured to determine a runtime demand. For example, cmdpophelper thread 330 may access configuration information 333 that specifies how may job process threads are in thread pool 338. Based on the number of available threads in thread pool 338, cmdpophelper thread 330 selects a number of consumable commands to consume and locks the commands in command queue 340.

Prior to selecting commands to consume, cmdpophelper 330 may time order the commands (e.g., from youngest to oldest target date) and order the commands based on secondary factors (e.g., priority). Cmdpophelper thread 330 can then select the commands to consume in order from the top of the ordered list.

Cmdpophelper thread 330 processes consumed commands. According to one embodiment, for example, cmdpophelper 330 uses the information in a command read from queue 340 to gather job data (e.g., all the data needed by a job process thread to process a job). For example, cmdpophelper thread 330 may access a document to be translated and other data needed to perform a translation and pass the document and other data to a local queue 336 (e.g., a FIFO queue of a thread pool manager) where the job data can be picked up by any job processor thread in thread pool 338. The job data corresponding to a consumed command may include the priority information from the command and, hence, the priority information from a corresponding input message. Further, job data corresponding to the consumed command may include the subscribed compartment so that subsequent commands corresponding to the same input request can be isolated to the same compartment.

The job processor threads of thread pool 338 are configured to carry out the primary job processing tasks, such as translating a document from one electronic format to another based on a set of job data read from local queue 336. Each job processor thread can include a command producer that produces commands corresponding to completed jobs and having a message type and subtype combination so that the commands will be picked up by response producer 316. As part of producing a command, a job processor thread of pool 338 can use the compartment information passed with the job data to assign a command produced by the job processor thread to the same compartment. The job processor thread can use the priority information passed with the job data to determine a target time for the command in order to control when the command will be processed by response producer 316.

Each transformation A job service 321, 322, 323, 324 may also include cmdpophelper threads that use the same message type and subtype as cmdpophelper thread 330 as selection criteria. However, by establishing policies to assign commands to compartments and subscribing services 320, 321, 322, 323, 324 to different compartments, processing of commands can be isolated to compartments as dictated by the policies and subscriptions. For example, by establishing a policy to assign commands corresponding to requests by a particular tenant to a compartment and subscribing transformation A job service 320 to that compartment, the bulk of the processing for that tenant's requests for type A translations can be isolated to service 320, which, depending on the policies, may not be shared by other tenants.

System 300 further comprises an admin component 366 that monitors which virtual computational resources are running and provides an interface (e.g., web-based interface, command line interface or other interface) that allows a user at a client computer to specify compartment system properties, processing compartment definitions, subscriptions for individual virtual computational resources and policies for assigning commands to compartments. In some embodiments, admin component 366 may provide rules to ensure that no compartment can be configured with inadequate resources to handle processing. For example, the admin component 366 may require a minimum number of service instances to be subscribed to a compartment.

Configuration data, such as compartment system parameters 371, compartment definitions 372, subscriptions 374 and policies 376 can be stored in a configuration database or other configuration data store 362. At least some of the configuration data may be pushed to cache. For example, compartment system parameters can be pushed to global cache 390, policies can be pushed to policy constraint cache 360 for access by policy engine 314 and subscriptions can be pushed to subscription caches (e.g., subscription cache 332). In one embodiment, only the subscriptions for a particular virtual computational resource are pushed to the subscription cache of that resource. For example, according to one embodiment, subscription cache 332 only contains the subscriptions for job transformation A service 320. An indication of whether compartments are enabled can be pushed to policy constraint cache 360 or the subscription caches.

It will be appreciated that request processing systems 200, 310 are provided by way of example. For example, a policy engine may be in a different virtual computational resource than a message consumer or a message producer. Moreover, a processing system may include virtual computational resources that operate in series on a request. For example, system 310 may include a parser service that processes a command corresponding to request prior to transformation A or transformation B services in the processing flow. Embodiments of using compartments to isolate requests may be implemented in a wide variety of systems to control processing based on compartments.

FIG. 4 illustrates an example of a user interface page 400 for providing a set of compartment system properties for a request processing system. Compartment configuration system properties can specify a set of information that limits how compartments and subscriptions are defined in subsequent steps and whether compartment processing is enabled. Compartment system properties may be globally cached for virtual computational resources that support compartmentalization.

User interface page may provide controls (e.g., checkboxes, radio buttons or other controls) to specify the types of virtual computational resources that can be compartmentalized. Some types of virtual computational resources may not be available for selection. For example, user interface page 400 may be provided for a processing system 300 that includes virtual computational resources (e.g., JVMs or other virtual computational resources) configured to provide instances of a message service, transformation A job service, transformation B job service and an AI job service. In this example, user interface page 400 includes controls 402 that allow the user to select which services may be included in compartment subscriptions (which services are compartmentable). Here, the user has no option to compartmentalize the message service, but can compartmentalize the transformation A job service, transformation B job service or AI job service.

Control 404 allows the user to specify the minimum number of virtual computational resources (e.g., JVMs or other virtual computational resources) that must subscribe to a compartment. For example, in FIG. 4, the user can specify the minimum number of service instances of request processing system 300 that must subscribe to a compartment. This limitation may apply to user-defined compartments. The limitation may also apply to a default compartment.

Control 406 allows the user to specify whether compartment processing is enabled. If, enable compartment selector is selected, the admin component (e.g., admin component 278, 366) can signal the virtual computational resources that support compartmentalization that compartment processing is enabled. Using the example of processing system 300, admin component 366 can signal the cmdpophelpers of virtual computational resources 320, 321, 322, 323, 324, 325, 326 to use compartments as a selection criteria. In one embodiment, the admin component 366 can push an indication that compartment processing is enabled to the global caches 390 of the virtual computational resources.

A processing system may be configured with a default compartment and additional compartments can be defined by a user. FIG. 5A illustrates one embodiment of a user interface page 500 that allows a user to add or delete compartments. Interface page 500 lists existing compartments, in this case a Default compartment and an additional Quarantine compartment. By selecting add control 502, the user can create a definition of a new compartment.

FIG. 5B illustrates one embodiment a user interface page 510 to allow a user to define a new compartment. Compartments are named resources and, as such, the user may name the compartment. Here the user defines a new compartment named VIP. A user may also specify whether a compartment is active or inactive. According to one embodiment, only subscriptions to active compartments are pushed to the subscription caches of the virtual computational resources.

FIG. 5C illustrates an example of a user interface page 520 for specifying subscriptions for individual virtual computational resources to handle requests intended for a specific compartment. According to one embodiment, virtual computational resources are implicitly subscribed to the default compartment until they are subscribed to other compartments. Interface page 520, however provides controls to subscribe virtual computational resources to the VIP compartment. In this particular example, the user is presented with the running service instances of the compartmentable services specified in the compartment system properties (e.g., as input using controls 402 FIG. 4).

Based on the user selections, the admin component can configure the virtual computational resources to consume commands assigned to particular compartments. For example, the subscription to the VIP compartment can be pushed to the subscription caches of transformation A job service 320 and transformation A job service 323 of FIG. 3.

It can be noted that all the service instances in FIG. 5C are transformation A job service instances. However, it will be appreciated that instances of multiple compartmentable services can be subscribed to a processing compartment. Thus, request processing for multiple steps in the processing flow—e.g., processing by multiple virtual computational resources providing different services in series—can be isolated to a compartment.

According to one embodiment, a virtual computational resource is implicitly unsubscribed from the default compartment when it is subscribed to another compartment. However, the admin component may, in some embodiments, retain the implicit subscription to the default compartment if unsubscribing the virtual computational resource would cause the default compartment to have less than the minimum number of virtual computational resources specified in the system parameters (e.g., as set using control 404 of FIG. 4).

FIG. 5D illustrates an example user interface page 530 summarizing virtual computational resource to compartment subscriptions. Here it can be noted that, while the transformation A job service instance with the service ID 15 (transformation A job service 320 of FIG. 3), was not implicitly unsubscribed from the default compartment because doing so would result in too few transformation A job service instances being subscribed to the default compartment. The transformation A job service instance with service ID 15 can be automatically unsubscribed from the default compartment if an additional transformation A job service is invoked.

Figure 6:
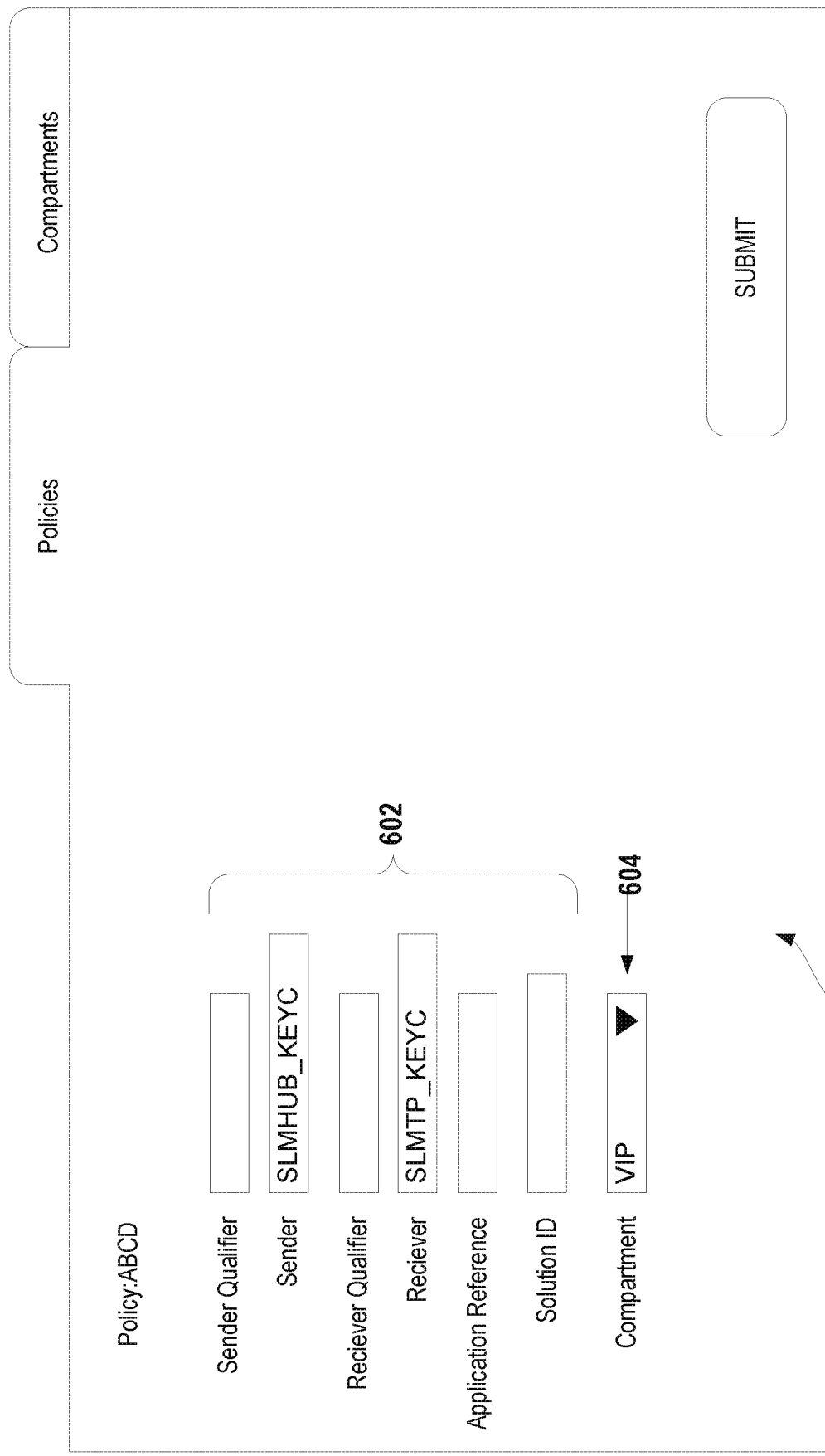
FIG. 6 is a diagrammatic representation of one embodiment of an operator interface for providing policy compartment constraints.

FIG. 6 illustrates an example user interface page 600 for defining compartment constraints for a policy. User interface page 600 includes controls 602 that allow a user to input constraint values for the various request attributes. The fields presented in interface page 600 can correspond to the attributes that are contained in requests to the request processing system. In this example it is assumed that each request to a request processing system contains values or pointers to values for the following attributes: sender qualifier, sender, receiver qualifier, receiver, application reference, solution id. Here, the user has specified that the policy compartment constraints are sender=SLMHUB_KEYC and receiver=SLMTP_KEYC.

Control 604 allows the user to specify a compartment. In this example, the user has selected the VIP compartment. According to the policy compartment constraints, requests having the combination sender: SLMHUB_KEYC and receiver:SLMTP_KEYC will be assigned to the VIP compartment by the policy engine that implements the constraints.

Figure 7:
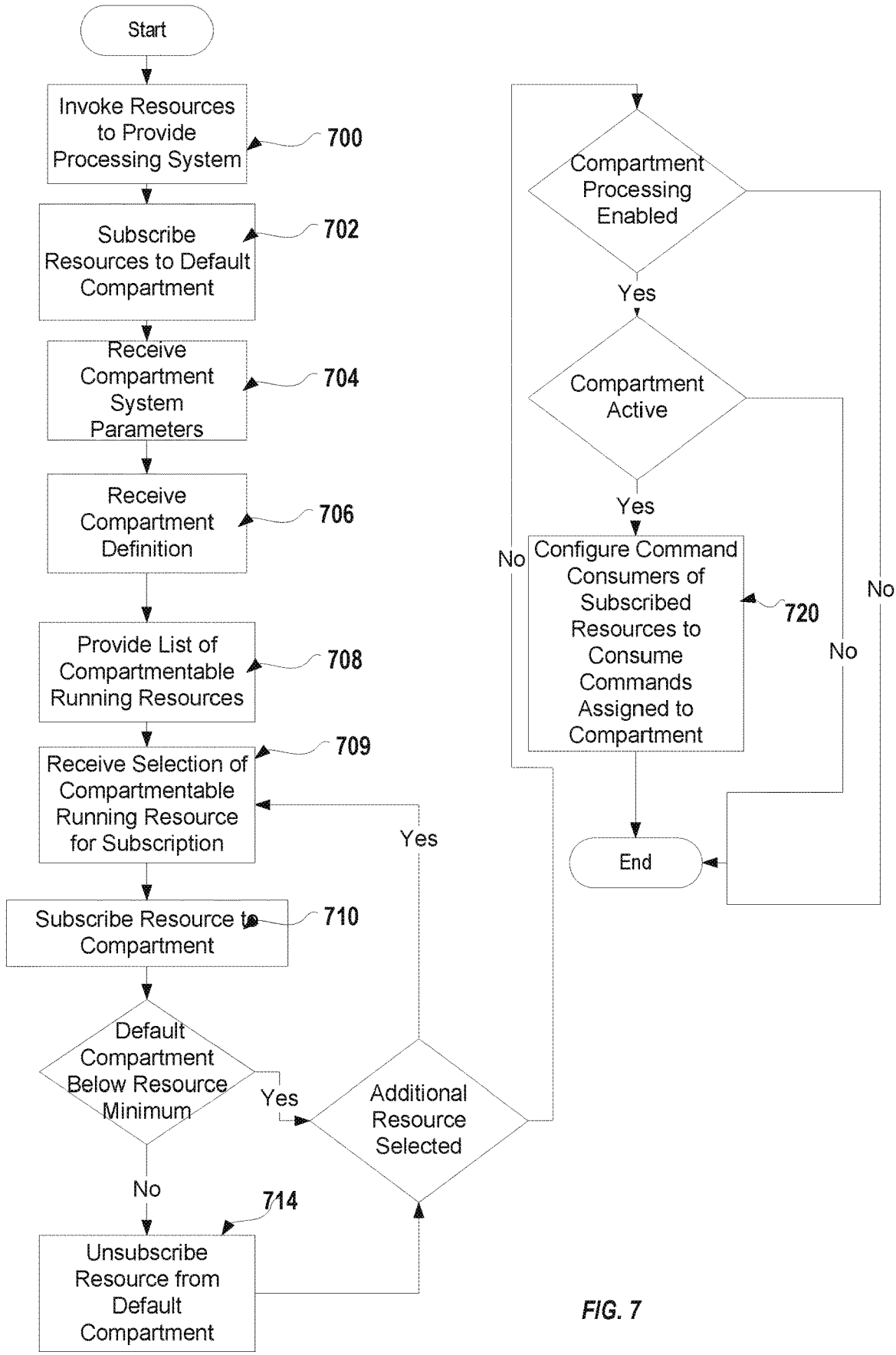
FIG. 7 is a flow chart of one embodiment of a method for configuring a processing system.

FIG. 7 is a flow chart illustrating one embodiment of configuring a processing system. One or more steps of FIG. 7 may be implemented by an administrative component (e.g., admin component 278, 366).

At step 700, the virtual computational resources of a processing system are invoked. For example, JMVs that provide services of the processing system can be invoked. The resources, when created, are automatically subscribed to a default compartment (step 702).

At step 704, a set of compartment system parameters (e.g., system parameters 271) can be received. According to one embodiment, the parameters are received via a user interface presented by the admin component. The compartment system parameters may specify, for example, compartmentable virtual computational resources, a minimum number of virtual resources that must be subscribed to a compartment and whether compartment processing is enabled. The compartment system parameters may be stored in a configuration data store (e.g., as a compartment system parameters 271, 371). Compartment system parameters may also be pushed to a global cache (e.g., global cache 290, 390) accessible by all the instances of a compartmentable service. In another embodiment, compartment system parameters may be pushed to caches specific to each virtual computational resource that uses the compartment system parameters.

At step 706, a compartment definition is received. The admin component, according to one embodiment, can present a user interface through which a user can provide compartment definitions. A compartment definition, according to one embodiment, may include a compartment name and an active/inactive status. It can be noted that a compartment may also be considered inactive if two few virtual computational resources are subscribed to the compartment. The compartment definition may be stored in a configuration data store (e.g., as a compartment definition 272, 372).

A user can be provided a list running compartmentable virtual computational resources (step 708). At step 709, a selection of a virtual computational resource is received. At step 710, the selected virtual computational resource is subscribed to the compartment. If unsubscribing the virtual computational resource from the default compartment will not cause the default compartment to fall below the minimum subscribed virtual computational resources specified in the system parameters, the selected virtual computational resource is unsubscribed from the default compartment (step 714). Steps 709-714 can be repeated for each virtual computational resource selected for subscription to the compartment. The subscriptions of virtual computational resources to compartments can be stored (e.g., as subscriptions 274, 374).

If compartment processing is enabled and the compartment is active, a virtual computational resource that is subscribed to a compartment can be configured to consume commands assigned to the compartment (step 720). According to one embodiment, for example, the subscription to the compartment can be pushed to a subscription caches of the subscribed virtual computational resources. In another embodiment, the subscriptions are pushed to the subscribed virtual computational resources even if compartment processing is not enabled and the command consumers determine whether to apply the subscriptions.

The steps of FIG. 7 are provided by way of example and may be performed in other orders. Moreover, steps may be repeated or omitted or additional steps added. For example, steps may be repeated for multiple messages/commands.

Figure 8:
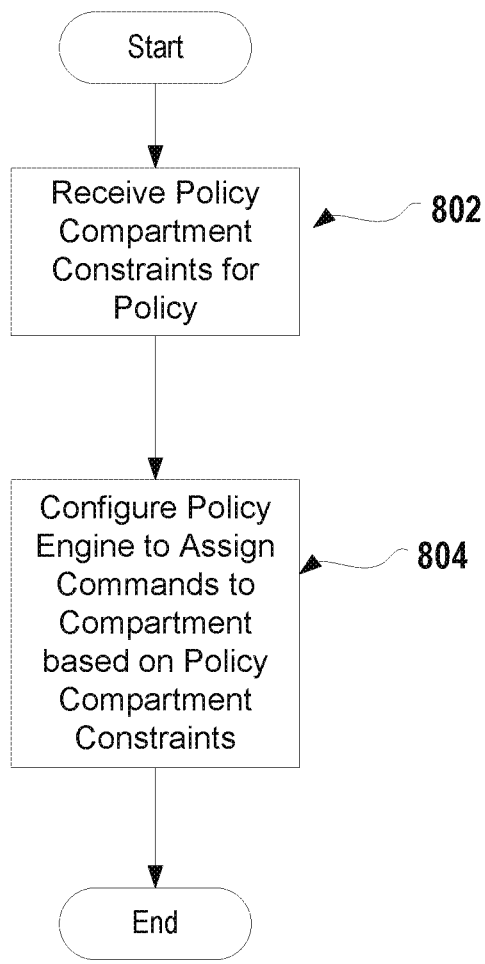
FIG. 8 is a flow chart illustrating further steps for configuring a processing system according to one embodiment.

FIG. 8 is a flow chart illustrating further steps for configuring a processing system according to one embodiment. One or more steps of FIG. 8 may be implemented by an administrative component (e.g., admin component 278, 366).

The admin component can present a user interface that allows a user to input policy compartment constraint parameters. According to one embodiment, the user interface may include controls based on a request data model. The controls can be configured to all a user to provide constraint values for attributes of requests. At step 802, the admin component can receive compartment constraints associated with a compartment. The policy compartment constraints can be stored in a configuration data store (e.g., in policies 276, 376).

At step 804, a policy engine can be configured to assign commands to a compartment based on policy compartment constraints. According to one embodiment, for example a policy comprising the policy compartment constraints can be pushed to a policy constraint cache used by the policy engine.

Figure 9:
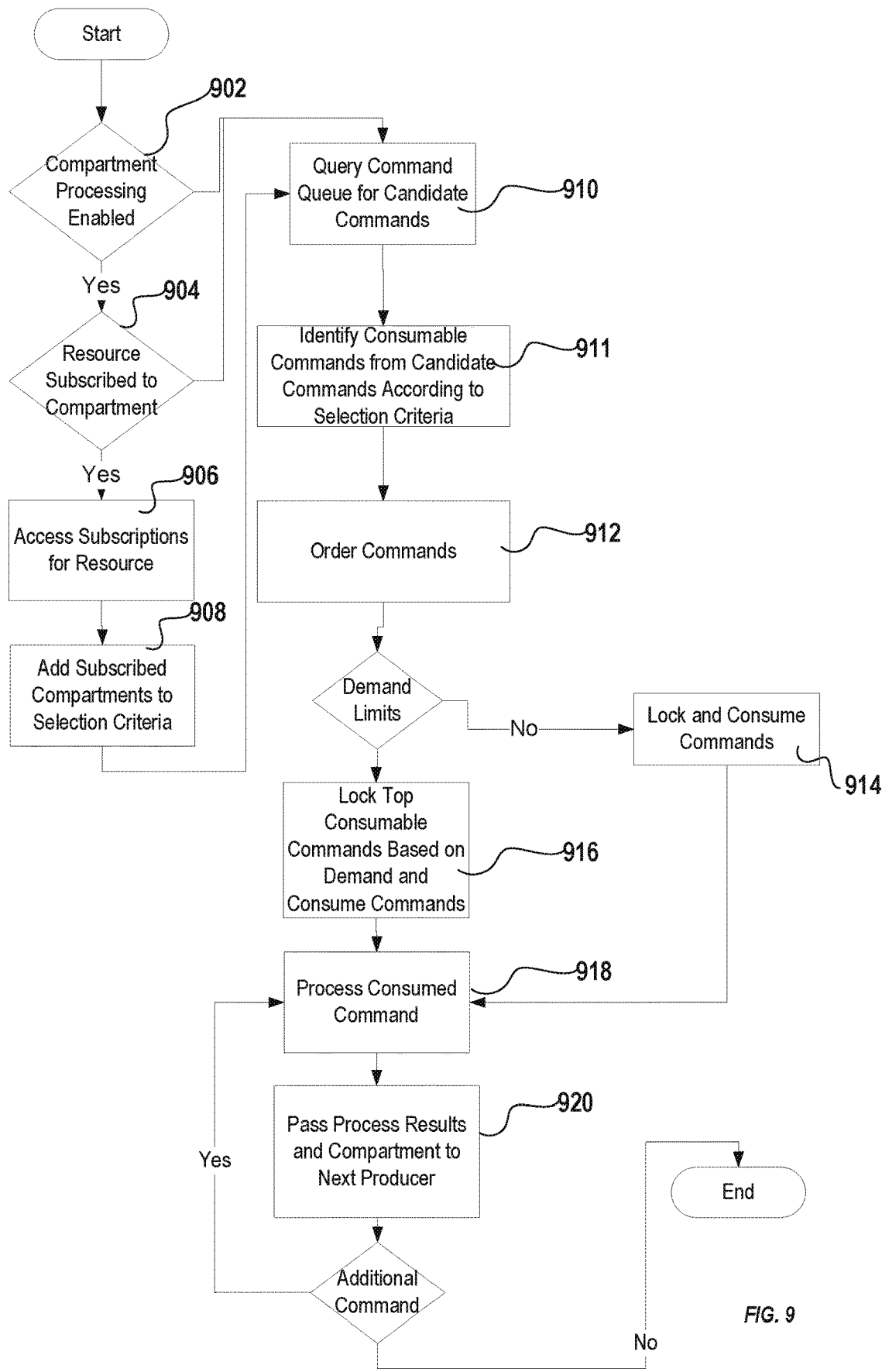
FIG. 9 is a flow chart of one embodiment of command consumer method.

FIG. 9 is a flow chart of one embodiment of a method that may be applied by a command consumer, such as command consumers 230, 240, cmdpophelper 330 or other command consumer.

At step 902, the command consumer of a virtual computational resource determines if compartment processing is enabled. For example, an indication of whether compartment processing is enabled may be contained in a global cache or other cache (e.g., subscription cache of the virtual computational resource (e.g., subscription cache 232, 242, 332)). If compartment processing is enabled, the command consumer determines if the virtual computational resource is subscribed to a compartment (step 904). For example, the command consumer determines if any subscriptions are stored in the subscription cache of the virtual computational resource. The command consumer accesses the subscriptions for the virtual computational resource to determine compartments to which the virtual computational resource is subscribed (subscribed compartments) (step 906).

Each command consumer is configured with selection criteria for selecting commands from the command queue. At step 908, the subscribed compartments are added to the selection criteria of the command consumer. According to one embodiment, selection criteria can be added as WHERE clauses to a query. Multiple subscribed compartments may be added as criteria if the virtual computational resource is subscribed to multiple compartments.

The command consumer selects commands from the command queue (e.g., command queue 220, 340) according to the selection criteria of the command consumer. According to one embodiment, the command consumer scans a command queue for candidate commands that have an expired target time (step 910). This may also include scanning the command queue for commands that are not locked by a command consumer. In one embodiment, the command consumer scans the command queue by querying a database or cache holding the command queue for candidate commands.

At step 911, the command consumer applies the selection criteria to the candidate commands to identify consumable commands. For example, the command consumer may identify consumable commands having particular metadata values, such as commands of a particular type and having a compartment value matching a subscribed compartment. In some embodiments, identifying the consumable commands may be implemented as part of scanning the command queue. For example, the command consumer may query a database or cache for commands that meet particular criteria.

The command consumer can order the consumable commands (step 912). For example, in one embodiment, the command consumer can order commands based on target time from oldest to youngest. The command consumer may also perform a secondary ordering of the consumable commands based, for example, on priority information.

If the command consumer is not limited by demand as configured in the configuration information for the command consumer, the command consumer, at step 914, consumes all the consumable commands identified using the selection criteria. The command consumer can write to the appropriate rows in the command queue to lock the commands.

If the command consumer is limited by demand as configured in the configuration information for the command consumer, the command consumer, at step 916, can execute a demand function to determine how many commands it can consume from the scan and select a subset of consumable candidate commands for consumption based on the demand function. For example, if there are four processing threads available to receive data from the command consumer, the command consumer may limit the commands it selects for consumption to a multiple of four as specified in the consumer configuration information and lock only that number of commands. According to one embodiment, the command consumer can select the subset of consumable commands based on a demand function as described in U.S. patent application Ser. No. 15/956,556, entitled "Producer-Side Prioritization of Message Processing," filed Apr. 18, 2018.

At step 918, the command consumer can process a consumed command. The processing of a command can include processing a set of data corresponding to the input request contained in the command to obtain or generate additional data corresponding to the input request. The processing can depend on the application system in which the command consumer is implemented. In any event, the command consumer can pass the results of processing a command to a next producer (command producer or message producer) along with the subscribed compartment information from the command (step 920). In addition to the subscribed compartment information, the data passed to the next producer can include data corresponding to an input request extracted from a command consumed by the command consumer or data obtained or produced by the command consumer based on a command consumed by the command consumer. Steps 918-920 can be repeated for each command consumed.

The steps of FIG. 9 are provided by way of example and may be performed in other orders. Moreover, steps may be repeated or omitted or additional steps added. For example, according to one embodiment command consumers that are not configured to use subscriptions may skip steps 902-908. According to one embodiment, the steps of FIG. 9 may be executed for each message or command in a set of commands.

Figure 10:
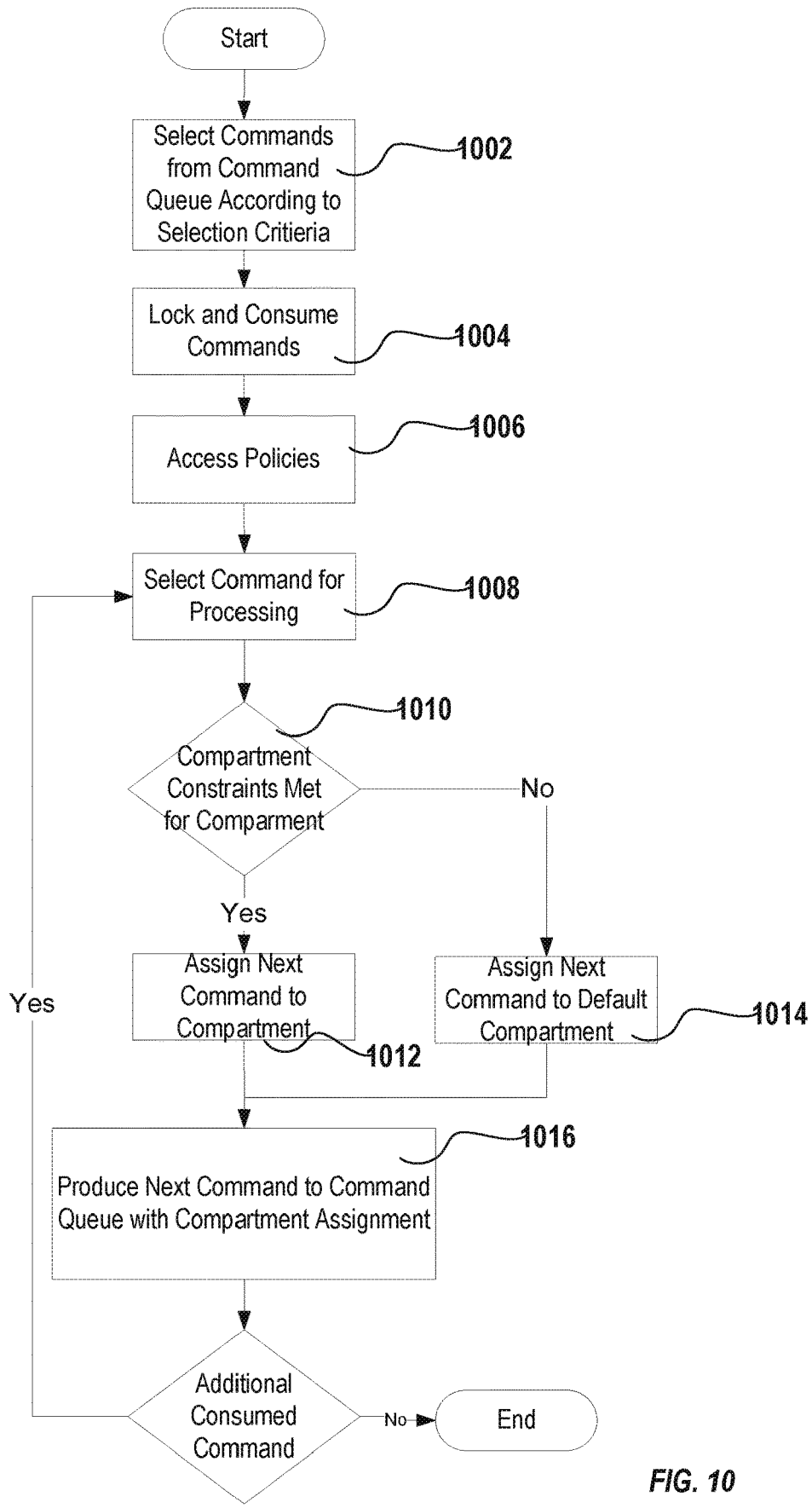
FIG. 10 is a flow chart of one embodiment of a policy engine method.

FIG. 10 is a flow chart illustrating one embodiment of a method that may be performed by a policy engine (e.g., policy engine 224, 314). At step 1002, the policy engine selects commands for consumption from the command queue (e.g., command queue 220, 340) according to policy engine selection criteria. Commands may be selected from the queue as discussed above with respect to command consumers, using the policy engine's selection criteria.

According to one embodiment, the policy engine scans the command queue for commands that have an expired target time and are not locked by a command consumer. In one embodiment, the policy engine scans the command queue by querying a database or cache holding the command queue for candidate commands.

The policy engine applies selection criteria to the candidate commands to select commands for consumption. For example, the policy engine may identify consumable commands having particular metadata values (e.g., combination of type or subtype) or commands meeting other criteria. In some embodiments, identifying the consumable commands may be implemented as part of scanning the command queue. For example, the policy engine may query a database or cache for commands that meet particular criteria.

The policy engine can order the consumable commands based on target time from oldest to youngest. The policy engine may also perform a secondary ordering of the consumable commands based, for example, on priority information.

The policy engine, at step 1004, consumes commands identified using the selection criteria. The command consumer may also write to the appropriate rows in the command queue to lock the commands.

At step 1006, the policy engine accesses policies comprising criteria for assigning commands corresponding to requests (e.g., requests from tenants) to compartments. According to one embodiment, the policy engine accesses policies from a policy constraint cache (e.g., policy constraint cache 228, 360).

The policy engine processes the consumed commands. Thus, at step 1008, the policy engine may select a consumed command for processing. The processing of a consumed command can include processing a set of data contained in the consumed command to obtain or generate additional data. As part of processing a consumed command corresponding to an input request, the policy engine can determine a compartment to which to assign the next command corresponding to the request according to the policies. According to one embodiment, the policy engine compares the information associated with an input request, which may include information from the consumed command or information obtained or generated using information from the consumed command, to the policy compartment constraints (step 1010). If the information associated with the request meets the policy compartment constraints for a compartment, the policy engine assigns the next command corresponding to the input request to the compartment for which the constraints were met (step 1012). If the information associated with the request does not meet the policy compartment constraints for a compartment, the policy engine can assign the next command corresponding to the input request to a default compartment (step 1014).

The policy engine may also perform other processing of a consumed command. For example, the policy engine may use the information associated with an input request to determine the type of command to produce (for example type and subtype) and other information to be included in the next command. The type of command and information to be included can depend on the application system in which the policy engine is implemented and policies. Further, the policy engine may determine a target time for the command as described in U.S. patent application Ser. No. 15/956,556, entitled "Producer-Side Prioritization of Message Processing," filed Apr. 18, 2018.

At step 1016, the policy engine produces the next command corresponding to the request. The produced command metadata specifies the compartment to which the command was assigned by the policy engine. The policy engine sends the command to shared command queue (e.g., queue 220, queue 340) for consumption by a command consumer. Steps 1008-1016 may be repeated for each consumed command.

The steps of FIG. 10 are provided by way of example and may be performed in other orders. Moreover, steps may be repeated or omitted or additional steps added.

Figure 11:
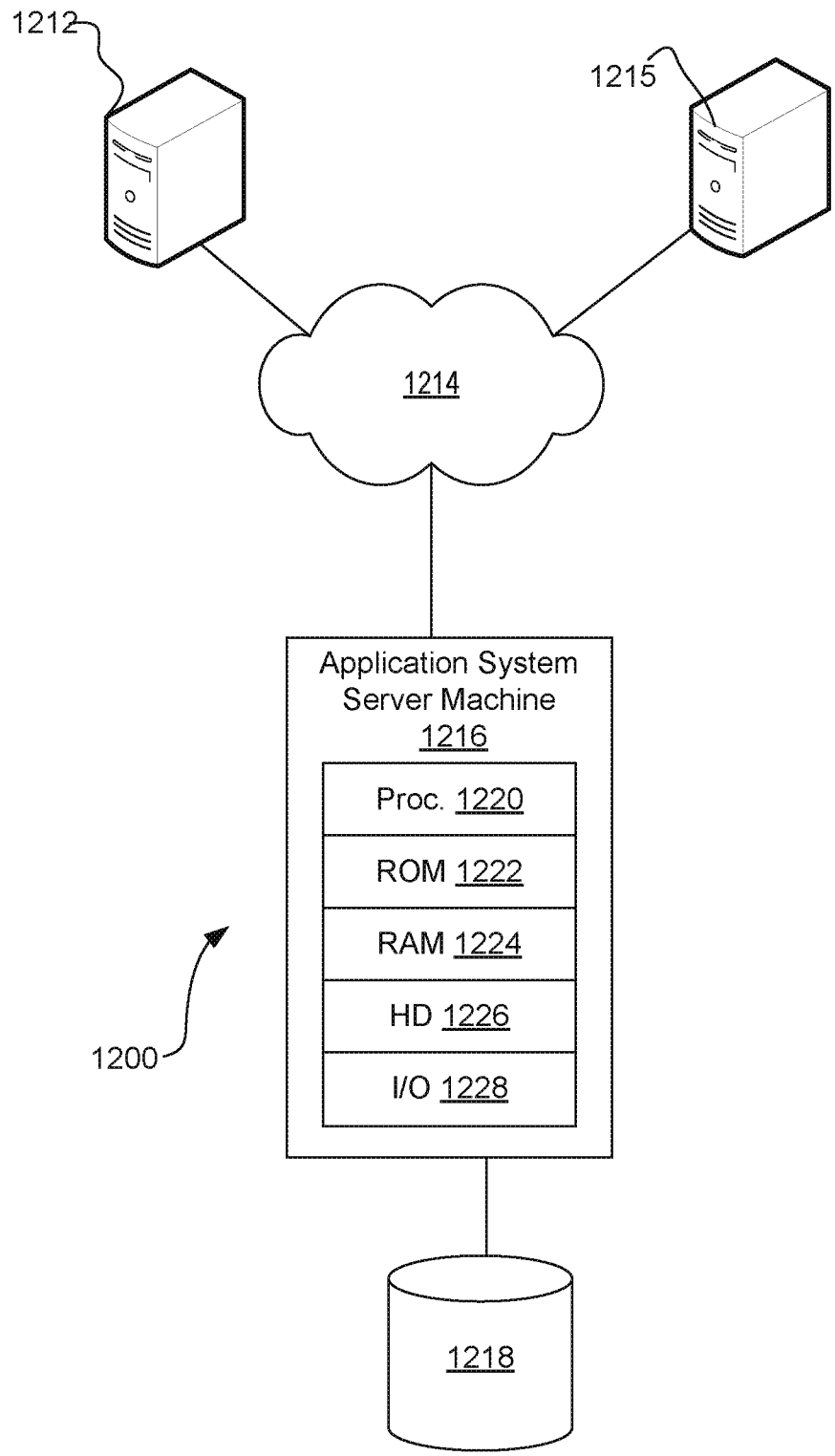
FIG. 11 is a diagrammatic representation of a distributed network computing environment.

FIG. 11 is diagrammatic representation of a distributed network computing environment 1200 where embodiments disclosed can be implemented. In the example illustrated, network computing environment 1200 includes network 1214 that can be bi-directionally coupled to first enterprise computer 1212, second enterprise computer 1215 and an application system server computer 1216. Application system server computer 1216 can be bi-directionally coupled to a data store 1218. Network 1214 may represent a combination of wired and wireless networks that network computing environment 1200 may utilize for various types of network communications known to those skilled in the art.

For the purpose of illustration, a single system is shown for each of first enterprise computer 1212, second enterprise computer 1215 and application system server computer 1216. However, with each of first enterprise computer 1212, second enterprise computer 1215 and application system server computer 1216 may comprise a plurality of computers (not shown) interconnected to each other over network 1214. For example, a plurality of first enterprise computers 1212 and a plurality of second enterprise computers 1215 may be coupled to network 1214.

First enterprise computer 1212 and second enterprise computer may include software components configured to send messages to a message queue or read messages from a message queue. Application system server computer 1216 comprises an application system configured to ingest messages from components at first enterprise computer 1212 or second enterprise computer 1215 from the input message queue, process the messages and place responses in a message queue. Application system server computer 1216 may invoke virtual computational resources to provide a request processing system.

Application system server computer 1216 can include a processor 1220, read-only memory ("ROM") 1222, random access memory ("RAM") 1224, hard drive ("HD") or storage memory 1226, and input/output device(s) ("I/O") 1228. Application system server computer 1216 may include one or more backend systems configured for providing a variety of services to first enterprise computers 1212 and second enterprise computer 1215 over network 1214. Application system server computer 1216 may utilize data stored in a data store 1218. Many other alternative configurations are possible and known to skilled artisans.

Each of first enterprise computer 1212, second enterprise computer 1215, application system server computer 1216 of FIG. 11 may have more than one processor, ROM, RAM, HD, I/O, or other hardware components. For the sake of brevity, application system server computer 1216 is illustrated as having one of each of the hardware components, even if more than one is used.

Portions of the methods described herein may be implemented in suitable software code that may reside within ROM; RAM; or HD. Application system server computer 1216 may include, for example, a set of computer instructions stored on a computer readable medium (e.g., RAM, HD, ROM or other computer readable medium) that are executable by processor 1220 to provide a request processing system, such as a request processing system 200, 300 or other request processing system. In addition to those types of memories, the instructions in an embodiment disclosed herein may be contained on a data storage device with a different computer-readable storage medium. The instructions may be stored as software code elements on a data storage array, magnetic tape, floppy diskette, optical storage device, or other appropriate data processing system readable medium or storage device.

Embodiments of request processing systems may be implemented in a cloud computing environment. A request processing system may be implemented by virtual computational resources (e.g., virtual machines or other virtual computational resources) on a server computer.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments discussed herein can be implemented in suitable instructions that may reside on a non-transitory computer readable medium, hardware circuitry or the like, or any combination and that may be translatable by one or more server machines. ROM, RAM, and HD are computer memories for storing computer-executable instructions executable by a CPU or other processor or capable of being compiled or interpreted to be executable by the CPU or other processor. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

A "computer-readable medium" may be any medium that can contain or store a program for use by or in connection with the instruction execution system, apparatus, system or device. The computer readable medium can be, by way of example only but not by limitation, an electronic, magnetic, optical, electromagnetic, or semiconductor system, apparatus, system, device or computer memory. Such computer-readable medium shall generally be machine readable and include software programming or code. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise a non-transitory computer readable media storing computer instructions translatable by a processor in a computing environment.

A "processor," unless context dictates otherwise, includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. An apparatus for isolating requests of specific tenants to corresponding command consumers, comprising:
   a processor;
   a non-transitory computer readable medium storing computer instructions executable by the processor to provide a processing system that includes:
   a shared command queue which stores commands corresponding to requests for processing from a plurality of tenants;
   a first computational resource configured to apply policies containing command assignment criteria applicable to the plurality of tenants to the commands in the shared command queue and assign each command in the shared command queue to a corresponding one of a plurality of processing compartments based on the policies and one of the plurality of tenants associated with the command, each command in the shared command queue comprising an entry specifying the corresponding processing compartment to which the each command is assigned; and
   a second computational resource configured to determine a subscribed one of the processing compartments to which the second computational resource is subscribed, select commands from the shared command queue that include requests isolated for one of the tenants to the subscribed processing compartment, and consume the selected commands from the shared command queue.

2. The apparatus of claim 1, wherein the processing system comprises a plurality of computational resources that share the shared command queue, the plurality of computational resources subscribed to a plurality of processing compartments.

3. The apparatus of claim 1, wherein the processing system comprises a third computational resource, the third computational resource subscribed to a second processing compartment and comprising a second command consumer configured to:
   select commands from the shared command queue that are assigned to the second processing compartment; and
   consume the selected commands assigned to the second processing compartment from the shared command queue for processing by the third computational resource.

4. The apparatus of claim 3, wherein the second computational resource and third computational resource are instances of a same service.

5. The apparatus of claim 3, wherein the first computational resource is a first virtual machine, the second computational resource is a second virtual machine and the third computational resource is a third virtual machine.

6. The apparatus of claim 1, wherein the computer instructions are executable to provide an administrative client having a user interface with controls to allow a user to define the plurality of processing compartments, the policies containing the command assignment criteria, and subscriptions of a plurality of computational resources including the second computational resource to a plurality of processing compartments including the subscribed processing compartment.

7. The apparatus of claim 6, wherein the second computational resource comprises a subscription cache for caching subscriptions of a plurality of computational resources including the second computational resource to a plurality of processing compartments including the subscribed processing compartment and the second computational resource comprises a command consumer configured to access the subscription from the subscription cache.

8. The apparatus of claim 7, wherein the first computational resource comprises a policy constraint cache configured to cache the policies containing the command assignment criteria and wherein the first computational resource comprises a policy engine configured to access the policies from the policy constraint cache.

9. The apparatus of claim 8, wherein the processing system further comprises a message consumer to consume input messages from a message queue and an output message producer to produce output messages to an output message queue, wherein the input messages comprise the requests from the plurality of tenants.

10. The apparatus of claim 9, wherein the policy engine and the command consumer are between the message consumer and the message producer in a processing flow of the processing system.

11. The apparatus of claim 8, wherein the policies comprise a policy that isolates a tenant's requests to the subscribed processing compartment.

12. A computer program product comprising a non-transitory computer readable medium storing a set of computer instructions executable by a processor to:
   invoke a first computational resource configured to apply policies containing command assignment criteria applicable to a plurality of tenants to commands in a shared command queue, and assign each command in the shared command queue to a corresponding one of a plurality of processing compartments based at least in part on the policies;
   invoke a second computational resource configured to determine a subscribed one of the processing compartments to which the second computational resource is subscribed, select commands from the shared command queue that include requests isolated for one of the tenants to the subscribed processing compartment, and consume the selected commands from the shared command queue.

13. The computer program product of claim 12, wherein the set of instructions are executable to invoke a plurality of computational resources configured to consume commands from the shared command queue and subscribe the plurality of computational resources to a plurality of processing compartments.

14. The computer program product of claim 12, wherein the set of computer instructions are further executable to:
   invoke a third computational resource configured to access a subscription for the third computational resource to determine a subscribed processing compartment to which the third computational resource is subscribed, select commands from the shared command queue that are assigned to the subscribed processing compartment to which the third computational resource is subscribed, and consume the selected commands that are assigned to the subscribed processing compartment to which the third computational resource is subscribed.

15. The computer program product of claim 14, wherein the second computational resource and third computational resource are instances of a same service.

16. The computer program product of claim 15, wherein the first computational resource is a first virtual machine, the second computational resource is a second virtual machine and the third computational resource is a third virtual machine.

17. The computer program product of claim 12, wherein the set of computer instructions are executable to provide an administrative client having a user interface with controls to allow a user to define the plurality of processing compartments, the policies containing the command assignment criteria, and subscriptions of a plurality of computational resources including the second computational resource to a plurality of processing compartments including the subscribed processing compartment.

18. The computer program product of claim 17, wherein the second computational resource comprises a subscription cache for caching subscriptions of a plurality of computational resources including the second computational resource to a plurality of processing compartments including the subscribed processing compartment and the second computational resource comprises a command consumer configured to access the subscription from the subscription cache.

19. The computer program product of claim 18, wherein the first computational resource comprises a policy constraint cache for caching the policies containing the command assignment criteria and wherein the first computational resource comprises a policy engine configured to access the policies from the policy constraint cache.

20. The computer program product of claim 19, wherein the set of computer instructions are further executable to implement a message consumer to consume input messages from a message queue and an output message producer to produce output messages to an output message queue, wherein the input messages comprise the requests from the plurality of tenants, wherein the policy engine and the command consumer are between the message consumer and the message producer in a processing flow of a processing system, and wherein the policies comprise a policy that isolates a tenant's data to the first processing compartment.

\* \* \* \* \*